US012807888B2

(12) United States Patent
Alkilde et al.

(10) Patent No.: US 12,807,888 B2
(45) Date of Patent: Nov. 24, 2026

(54) PROCESS AND PLANT FOR PRODUCING E-FUELS

(71) Applicant: TOPSOE A/S, Kgs. Lyngby (DK)

(72) Inventors: Ole Frej Alkilde, Kgs. Lyngby (DK); Angelica Hidalgo Vivas, Kgs. Lyngby (DK); Kim Aasberg-Petersen, Kgs. Lyngby (DK); Peter Mølgaard Mortensen, Kgs. Lyngby (DK); Thomas Sandahl Christensen, Kgs. Lyngby (DK)

(73) Assignee: TOPSOE A/S, Kgs. Lyngby (DK)

( * ) Notice: Subject to any disclaimer, the term of this patent is extended or adjusted under 35 U.S.C. 154(b) by 550 days.

(21) Appl. No.: 18/276,341

(22) PCT Filed: Feb. 9, 2022

(86) PCT No.: PCT/EP2022/053062

§ 371 (c)(1),
(2) Date: Aug. 8, 2023

(87) PCT Pub. No.: WO2022/171643

PCT Pub. Date: Aug. 18, 2022

(65) Prior Publication Data

US 2024/0124786 A1 Apr. 18, 2024

(30) Foreign Application Priority Data

Feb. 9, 2021 (EP) .................................... 21155955

(51) Int. Cl.

| | |
|---|---|
| ***C10G 45/68*** | (2006.01) |
| ***C01B 3/38*** | (2026.01) |
| ***C10G 2/00*** | (2006.01) |
| ***C10G 65/04*** | (2006.01) |

(52) U.S. Cl.

CPC ................ *C10G 45/68* (2013.01); *C01B 3/38* (2013.01); *C10G 2/334* (2013.01); *C10G 65/046* (2013.01); *C01B 2203/0283* (2013.01); *C10G 2300/1022* (2013.01); *C10G 2400/02* (2013.01)

(58) Field of Classification Search

CPC ...... C10G 45/68; C10G 2/334; C10G 65/046; C01B 3/38

See application file for complete search history.

(56) References Cited

U.S. PATENT DOCUMENTS

| | | | |
|---|---|---|---|
| 3,763,205 | A | 10/1973 | Green |
| 3,871,993 | A | 3/1975 | Morrison |
| 4,520,216 | A | 5/1985 | Skov |
| 4,910,228 | A | 3/1990 | Lywood |
| 5,128,003 | A | 7/1992 | Murdoch et al. |
| 5,202,547 | A | 4/1993 | Abe et al. |
| 5,321,191 | A | 6/1994 | Alagy et al. |
| 5,817,286 | A | 10/1998 | Martin et al. |
| 6,207,042 | B1 | 3/2001 | Holtermann |
| 6,696,501 | B2 | 2/2004 | Schanke |
| 9,238,598 | B2 | 1/2016 | Hammad et al. |
| 9,752,080 | B2 | 9/2017 | Christensen |
| 10,011,789 | B2 * | 7/2018 | De Klerk ............. C10G 57/005 |
| 2002/0094312 | A1 | 7/2002 | Hanus et al. |
| 2002/0119084 | A1 | 8/2002 | Boneberg et al. |
| 2003/0065042 | A1 | 4/2003 | Shaw |
| 2003/0094381 | A1 | 5/2003 | Bors et al. |
| 2003/0143135 | A1 | 7/2003 | O'Rear |
| 2003/0191199 | A1 | 10/2003 | O'Rear |
| 2005/0069485 | A1 | 3/2005 | Jung et al. |
| 2006/0116543 | A1 | 6/2006 | Bellet et al. |
| 2006/0254141 | A1 | 11/2006 | Krause et al. |
| 2007/0244208 | A1 | 10/2007 | Shulenberger et al. |
| 2008/0021251 | A1 | 1/2008 | Iaccino et al. |
| 2008/0081844 | A1 | 4/2008 | Shires et al. |
| 2008/0096985 | A1 | 4/2008 | Minta et al. |
| 2008/0224097 | A1 | 9/2008 | Fujie et al. |
| 2009/0252919 | A1 | 10/2009 | Ogura |
| 2009/0307975 | A1 | 12/2009 | Wolf |
| 2010/0186291 | A1 | 7/2010 | Yie et al. |

(Continued)

FOREIGN PATENT DOCUMENTS

| | | | |
|---|---|---|---|
| AU | 70674/81 | A | 11/1981 |
| AU | 2019275850 | A1 | 11/2020 |

(Continued)

OTHER PUBLICATIONS

CN Office Action, including Search Report received for Chinese Patent Application No. 202080017669, mailed on Aug. 4, 2023, 12 pages (6 pages of English Translation and 6 pages of Original Document).
Danish Search Report mailed on Sep. 30, 2019 by the Danish Patent and Trademark Office for Danish Patent Application No. PA 2019 00434. (9 pages).
Decision to Grant received for Japanese Patent Application No. 2022-533388, mailed on Aug. 27, 2025, 5 pages (2 pages of English Translation and 3 pages of Original Document).
International Preliminary Report on Patentability received for PCT Patent Application No. PCT/EP20/059598, mailed on Oct. 21, 2021, 9 pages.
International Preliminary Report on Patentability received for PCT Patent Application No. PCT/EP20/059872, mailed on Oct. 7, 2021, 8 pages.

(Continued)

*Primary Examiner* — Sikarl A Witherspoon
(74) *Attorney, Agent, or Firm* — Boone IP Law

(57) ABSTRACT

Process and plant for producing a hydrocarbon product boiling in the gasoline boiling range, comprising: upgrading a naphtha containing stream derived from Fischer-Tropsch (FT) synthesis by passing the naphtha containing stream through an aromatization stage comprising contacting the naphtha containing stream with an aluminosilicate zeolite, thereby producing said hydrocarbon product boiling in the gasoline boiling range, and a separate light hydrocarbon gas stream, such as liquid petroleum gas (LPG) stream. The synthesis gas for the FT-synthesis is produced by electrically heated reverse water gas shift (e-RWGS) of a feedstock comprising $CO_2$ and $H_2$.

13 Claims, 2 Drawing Sheets

(56) References Cited

U.S. PATENT DOCUMENTS

| | | | |
|---|---|---|---|
| 2012/0178951 A1 | 7/2012 | Krull et al. |
| 2012/0201717 A1 | 8/2012 | Singh et al. |
| 2013/0034478 A1 | 2/2013 | Doty |
| 2013/0041051 A1 | 2/2013 | Zuberbuhler et al. |
| 2013/0065974 A1 | 3/2013 | Kresnyak |
| 2013/0082211 A1 | 4/2013 | Aasberg-Petersen et al. |
| 2014/0326640 A1 | 11/2014 | De Klerk |
| 2015/0129805 A1 | 5/2015 | Karpenko et al. |
| 2015/0175509 A1 | 6/2015 | Almqvist et al. |
| 2015/0259202 A1 | 9/2015 | Dybkjr et al. |
| 2015/0321918 A1 | 11/2015 | Noyes |
| 2015/0337211 A1 | 11/2015 | Dahl |
| 2016/0002036 A1 | 1/2016 | Kolaczkowski et al. |
| 2016/0024391 A1 | 1/2016 | Christensen et al. |
| 2016/0168489 A1 | 6/2016 | Kwon et al. |
| 2018/0194632 A1 | 7/2018 | Jakobsson et al. |
| 2019/0112187 A1 | 4/2019 | Mortensen et al. |
| 2019/0144376 A1 | 5/2019 | Højlund et al. |
| 2019/0211269 A1 | 7/2019 | Galloway |
| 2019/0225489 A1 | 7/2019 | Herskowitz et al. |
| 2019/0249094 A1 | 8/2019 | Snell |
| 2019/0359894 A1 | 11/2019 | Heidel et al. |
| 2020/0011225 A1 | 1/2020 | Hirth et al. |
| 2020/0063273 A1 | 2/2020 | Masel |
| 2020/0095124 A1 | 3/2020 | Rueger |
| 2020/0354216 A1 | 11/2020 | Mortensen |
| 2021/0113983 A1 | 4/2021 | Mortensen et al. |
| 2021/0171344 A1 | 6/2021 | Mortensen et al. |
| 2022/0081289 A1 | 3/2022 | De Sarkar et al. |
| 2022/0081292 A1 | 3/2022 | De Sarkar et al. |

FOREIGN PATENT DOCUMENTS

| | | | |
|---|---|---|---|
| CA | 287219 | A | 2/1929 |
| CA | 2872194 | A1 | 3/2016 |
| CL | 200101295 | | 2/2002 |
| CL | 200202268 | | 12/2003 |
| CN | 1031391 | C | 3/1996 |
| CN | 1407959 | A | 4/2003 |
| CN | 104169210 | A | 11/2014 |
| CN | 111247091 | A | 6/2020 |
| EP | 2594527 | A1 | 5/2013 |
| EP | 3574991 | A1 | 12/2019 |
| EP | 3670443 | A1 | 6/2020 |
| GB | 1443735 | A | 7/1976 |
| GB | 2077613 | A | 12/1981 |
| JP | 05-006120 | U | 1/1993 |
| JP | 2013-505125 | A | 2/2013 |
| JP | 2014-111768 | A | 6/2014 |
| JP | 2015-509905 | A | 4/2015 |
| JP | 2016511296 | A | 4/2016 |
| JP | 2018-104282 | A | 7/2018 |
| KR | 10-2009-0045519 | A | 5/2009 |
| KR | 10-2014-0140562 | A | 12/2014 |
| WO | 99/19277 | A1 | 4/1999 |
| WO | 00/01613 | A1 | 1/2000 |
| WO | 00/76651 | A1 | 12/2000 |
| WO | 2004/091773 | A1 | 10/2004 |
| WO | 2007108014 | A1 | 9/2007 |
| WO | 2012077198 | A1 | 6/2012 |
| WO | 2013/189791 | A1 | 12/2013 |
| WO | 2014/056535 | A1 | 4/2014 |
| WO | 2014/057013 | A1 | 4/2014 |
| WO | 2014/096226 | A1 | 6/2014 |
| WO | 2014/154691 | A1 | 10/2014 |
| WO | 2014170200 | A1 | 10/2014 |
| WO | 2015/015433 | A1 | 2/2015 |
| WO | 2015/123395 | A1 | 8/2015 |
| WO | 2015/128395 | A1 | 9/2015 |
| WO | 2016/207342 | A1 | 12/2016 |
| WO | 2018/153625 | A1 | 8/2018 |
| WO | 2019/020378 | A1 | 1/2019 |
| WO | 2019/020513 | A1 | 1/2019 |
| WO | 2019/020519 | A1 | 1/2019 |
| WO | 2019/110265 | A1 | 6/2019 |
| WO | 2019/110268 | A1 | 6/2019 |
| WO | 2019/110269 | A1 | 6/2019 |
| WO | 2019110267 | A1 | 6/2019 |
| WO | 2019/228795 | A1 | 12/2019 |
| WO | 2019/228796 | A1 | 12/2019 |
| WO | 2019/228798 | A1 | 12/2019 |
| WO | 2020/118236 | A1 | 6/2020 |
| WO | 2020/207926 | A1 | 10/2020 |
| WO | 2020/208008 | A1 | 10/2020 |
| WO | 2021110754 | A1 | 6/2021 |
| WO | 2021110806 | A1 | 6/2021 |
| WO | 2022/079010 | A1 | 4/2022 |
| WO | 2022079002 | A1 | 4/2022 |
| WO | 2022079098 | A1 | 4/2022 |
| WO | 2022161823 | A1 | 8/2022 |

OTHER PUBLICATIONS

International Search Report and Written Opinion received for PCT Patent Application No. PCT/EP2020/059598, mailed on Jul. 15, 2020, 11 pages.

International Search Report and Written Opinion received for PCT Patent Application No. PCT/EP2020/059872, mailed on Jul. 10, 2020, 10 pages.

Office Action received for Chinese Patent Application No. 202080017634, mailed on Aug. 11, 2023, 15 pages (8 pages of English Translation and 7 pages of Original Document).

Office Action received for Chinese Patent Application No. 202080017634, mailed on Mar. 13, 2024, 15 pages (9 pages of English Translation and 6 pages of Original Document).

Office Action received for Chinese Patent Application No. 202080017634, mailed on Sep. 20, 2024, 8 pages of Original document only.

Office Action received for Chinese Patent Application No. 202080017669, mailed on Feb. 8, 2024, 10 pages (6 pages of English Translation and 4 pages of Original Document).

Office Action received for Chinese Patent Application No. 202080084115.7, mailed on Nov. 9, 2023, 21 pages. (13 pages of English Translation and 8 pages of Original Document).

Office Action received for Chinese Patent Application No. 202180068289.9, mailed on Feb. 26, 2025, 18 pages. (11 pages of English Translation and 7 pages of Original Document).

Office Action received for Chinese Patent Application No. 202180068289.9, mailed on Jun. 28, 2024, 21 pages. (14 pages of English Translation and 7 pages of Original Document).

Office Action received for Chinese Patent Application No. 202280009346.0, mailed on May 26, 2025, 24 pages (12 pages of original office action and 12 pages of English Translation).

Office Action received for European Application No. 20717613, mailed on Mar. 27, 2024, 4 pages.

Office Action received for European Application No. 20717645, mailed on Apr. 25, 2024, 3 pages.

Office Action received for European Application No. 20816477, mailed on May 19, 2025, 4 pages.

Office Action received for European Application No. 21783568.5, mailed on Dec. 3, 2025, 3 pages.

Office Action received for Japanese Patent Application No. 2022-533388, mailed on Jan. 29, 2025, 08 pages (04 pages of English Translation and 04 pages of Original Document).

Office Action received for Korean Patent Application No. 10-2021-7026351, mailed on Apr. 7, 2025, 25 pages (14 pages of English Translation and 11 pages of Original Document).

Office Action received for Korean Patent Application No. 10-2021-7026711, mailed on Apr. 11, 2025, 16 pages (9 pages of English Translation and 7 pages of Original Document).

Office Action received for Korean Patent Application No. 10-2022-7018777, mailed on Dec. 10, 2025, 22 pages (10 pages of original office action and 12 pages of English Translation).

Office Action mailed on Nov. 12, 2024, by the European Patent Office for European Application No. (22 705 044.0), 7 pages.

U.S. Appl. No. 18/965,188 Sudip De Sarkar filed Dec. 2, 2024.

U.S. Appl. No. 17/420,491 Sudip De Sarkar filed Jul. 2, 2021.

(56) References Cited

OTHER PUBLICATIONS

International Search Report and Written Opinion (PCT/ISA/210 and PCT/ISA/237) mailed on May 12, 2022, by the European Patent Office as the Internal Searching Authority for International Application No. (PCT/EP2022/053062).
Extended European Search Report mailed on Jul. 8, 2021, by the European Patent Office for European Application No. (2115595534).
U.S. Appl. No. 17/778,039 Peter Mølgaard Mortensen filed May 19, 2022.
U.S. Appl. No. 18/245,730 Sudip De Sarkar filed Mar. 17, 2023.
U.S. Appl. No. 18/026,977 Kim Aasberg-Petersen filed Mar. 17, 2023.
U.S. Appl. No. 18/257,339 Kim Aasberg-Petersen filed Jun. 14, 2023.
Communication dated Mar. 25, 2021 and Search Report dated Mar. 17, 2021 issued in corresponding European Patent Application No. 20201822.2. (7 pages).
European Search Report issued in corresponding Application No. EP 19 21 3432 dated May 8, 2020.
European Search Report issued in corresponding Application No. EP 20 20 1817 dated Mar. 17, 2021.
Extended European Search Report dated Mar. 25, 2021, issued by the European Patent Office in corresponding European Application No. 20201816.4. (8 pages).
International Preliminary Report on Patentability received for PCT Patent Application No. PCT/EP2020/084408, mailed on Jun. 16, 2022, 8 pages.
International Preliminary Report on Patentability received for PCT Patent Application No. PCT/EP2021/078142, mailed on Apr. 27, 2023, 8 pages.
International Preliminary Report on Patentability received for PCT Patent Application No. PCT/EP2021/078304, mailed on Apr. 27, 2023, 8 pages.
International Preliminary Report on Patentability received for PCT Patent Application No. PCT/EP2022/051090, mailed on Aug. 10, 2023, 11 pages.
International Preliminary Report on Patentability received for PCT Patent Application No. PCT/EP2022/053062, mailed on Aug. 24, 2023, 11 pages.
International Search Report and Written Opinion received for PCT Patent Application No. PCT/EP2020/084408, mailed on Feb. 12, 2021, 11 pages.
International Search Report and Written Opinion received for PCT Patent Application No. PCT/EP2021/078142, mailed on Jan. 4, 2022, 11 pages.
International Search Report and Written Opinion received for PCT Patent Application No. PCT/EP2022/051090, mailed on May 10, 2022, 14 pages.
International Search Report and Written Opinion received for PCT Patent Application No. PCT/EP21/078304, mailed on Dec. 23, 2021, 11 pages.
Office Action received for European Application No. 20816477, mailed on Aug. 16, 2023, 6 pages.
Wu et al., "Methanation of CO2 and reverse water gas shift reaction on Ni/Si0 2 catalysts: the influence of particle size on selectivity and reaction pathway", Catalysis Science & Technology. vol. 5, No. 8, Jan. 1, 2015, pp. 4154-4163.
Yabe, Tomohiro et al., "Low-temperature dry reforming of methane to produce syngas in an electric field over La-doped Ni/ZrO2 catalysts", Fuel Processing Technology, Dec. 23, 2016, vol. 158, pp. 96-103, Elsevier B.V., NL. (8 pages).

* cited by examiner

PROCESS AND PLANT FOR PRODUCING E-FUELS

FIELD OF THE INVENTION

Embodiments of the invention generally relate to the production of e-fuels (electro-fuels). More specifically, embodiments of the invention relate to a process and plant for producing a synthesis gas from a feedstock comprising $CO_2$ and $H_2$, where the synthesis gas is produced by conducting a reverse water gas shift step e.g. by electrically heated reverse water gas shift, and said synthesis gas is used for the production of a hydrocarbon product i.e. a synthetic fuel (synfuel), in particular the simultaneous production of diesel and jet fuel by subsequent Fischer-Tropsch (FT) synthesis, as well as gasoline by subsequent aromatization of naphtha produced in the FT-synthesis. A light hydrocarbon gas, such as a liquid petroleum gas (LPG), is also generated e.g. in the aromatization from which a hydrogen stream may be produced and which may be used in the process or plant. The $CO_2$ in the feedstock may be derived from a prior step of carbon-capture and utilization (CCU), while the $H_2$ in the feedstock may be derived from a prior water (steam) electrolysis step.

BACKGROUND

The quality of gasoline (C5+ hydrocarbons) is highly dependent on the resistance to engine knocking due to compression ignition of the fuel in engines running on the gasoline. This quality is measured by the so-called octane number, originating from iso-octane being considered the ideal gasoline hydrocarbon. Thus, a pure iso-octane defines the gasoline as having the octane number 100, while a pure n-heptane defines the octane number 0. It would be desirable to produce a gasoline having a research octane number (RON) of at least 80, such as 85, 90 or higher.

In practice, gasoline is a complex hydrocarbon mixture and e.g. aromatics contribute to higher knock-resistance, while saturated alkanes, especially when having a linear structure, have a higher propensity to knocking. Therefore, naphtha hydrocarbon mixtures are less valuable if the aromatic content is very low.

Naphtha having insufficient octane number may be upgraded by a catalytic reforming process, which typically involves alkylation of aromatics to increase the octane number.

Normally also, in petrochemical applications paraffinic naphtha is used as feedstock for producing olefins such as ethylene and propylene as well as aromatics, mainly benzene and toluene. The olefins are then used for producing plastics, namely polyethylene and polypropylene.

US 2013065974 discloses the recycle of naphtha produced by FT synthesis to the reforming section of the plant.

Applicant's U.S. Pat. No. 9,752,080 discloses the use of LPG from a FT synthesis as feed to a steam reforming process for producing synthesis gas required in the FT-process.

U.S. Pat. No. 3,871,993 describes a process for converting virgin naphtha to a high-octane liquid gasoline product and LPG without hydrogen consumption by increasing the aromatics content of the naphtha via the use of zeolite such as ZSM-5 which may be modified with metals.

Applicant's co-pending patent application EP 20201822.2 (equivalent to PCT/EP2021/078304) describes the production of synthetic fuels via FT synthesis by preparing the synthesis gas for downstream FT-synthesis by using electrically heated reverse water gas shift and applicant's co-pending patent application PCT/EP2020/084291 (WO 2021110754) describes the production of synthetic fuels via FT synthesis by preparing the synthesis gas for downstream FT-synthesis by using electrically heated steam reforming.

The traditional way of converting a synthesis gas, i.e. a gas containing CO, $CO_2$ and $H_2$, into a synthetic fuel is by either converting it into methanol and then gasoline (for instance as disclosed in applicant's U.S. Pat. No. 4,520,216), or by converting the synthesis gas into jet fuel and/or diesel by FT synthesis and subsequent hydrocracking. None of these options can produce both gasoline, as well as jet and diesel simultaneously.

This prior art is also silent about a process or plant for converting a feedstock comprising $CO_2$ and $H_2$ into gasoline as well as jet and diesel, upgraded naphtha, and at the same time producing a light hydrocarbon gas such as LPG which for example can be used for production of hydrogen which may be used in the process or plant and/or recycled to the synthesis gas section for additional production of synthesis gas.

WO2007/108014 A1 discloses a process for producing liquid fuels from carbon dioxide and water. The feedstock for the production line is industrial carbon dioxide and water. Water is electrolysed into hydrogen and oxygen. Products, such as dimethyl ether or methanol may also be withdrawn from the production line. In an embodiment, FT-synthesis is conducted on synthesis gas derived by mixing hydrogen from electrolysis of water with carbon monoxide from the reverse water gas shift (RWGS) reaction of carbon dioxide. This citation is however concerned with the conversion of carbon dioxide and hydrogen to methanol and/or carbon monoxide and water and the further conversion to liquid fuels, and it is silent about the upgrading of naphtha produced in the FT-synthesis.

US2003/0143135 A1 discloses a process for upgrading at least one of a FT-naphtha and a FT-distillate to produce at least one of a gasoline component, a distillate fuel or a lube base feedstock component. The process includes reforming the FT-naphtha. The synthesis gas is prepared from methane and oxygen in a synthesis gas generator being fed with an oxidant stream. The naphtha upgrading is via catalytic reforming or so-called AROMAX reforming, whereby at least the latter produces a high yield of benzene, toluene, xylene, and with a catalyst which is heteroatom sensitive, thus requiring pretreatment such as hydrodeoxygenation (HDO), hydrodesulfurization (HDS), or hydrodenitrification (HDN).

US 2014/0326640 A1 discloses also a FT-jet fuel refining process. Synthesis gas is converted via FT-synthesis to FT-products including naphtha and the process further comprises upgrading at least a portion of the naphtha in an aromatization stage. This citation is silent on the synthesis gas generation step. The upgrading of naphtha is conducted by naphtha aromatisation using a non-acidic Pt/L zeolite or catalytic reforming, both methods requiring pretreatment for removal of heteroatoms, or by light hydrocarbon aromatization using a Ga or Zn promoted H-ZSM-5 zeolite, for which the presence of oxygenates are detrimental to catalyst lifetime.

US 2003/0191199 A1 discloses a process for reducing carbon dioxide emissions from a FT-reactor under the production of FT-products including naphtha and said carbon dioxide, reforming the naphtha in a naphtha reformer under the production of a C6-C10 product as well as hydrogen as by-product. The synthesis gas for FT is produced in a synthesis gas formation reactor by introducing a feed stream or separate streams comprising $CH_4$, $CO_2$, $O_2$ and $H_2O$. The $CO_2$ from the FT reactor and the hydrogen from the naphtha reforming are directed to the feed stream for converting at least a portion of the $CO_2$ into additional CO via the reverse water gas shift reaction. Hence, due to the provision of $CH_4$ and $CO_2$ in the feed stream, dry reforming by which $CH_4$ and $CO_2$ react to CO and $H_2$ is inherent. Further, the main sources of $CO_2$ and $H_2$ in the production of the synthesis gas are recycled streams from downstream units (FT reactor and naphtha reforming), while the upgrading of the naphtha is conducted by naphtha reforming, which implies the need of HDN/HDS to remove heteroatoms, also a stripper, and expensive noble catalysts, and further the aromatization product. (C6-C10) includes benzene, toluene and xylene. The presence of benzene in gasoline is normally unwanted, and if present it has to be at a very low level, e.g. below 1%, in a gasoline product.

None of the above citations disclose or teach a process or plant in which FT-synthesis gas is produced by RWGS of a carbon dioxide feed and hydrogen feed, and in which at the same time, a naphtha stream and/or an FT-condensate stream comprising oxygenates and olefins produced in the FT-synthesis, is upgraded by aromatization at specific conditions for thereby producing gasoline where the content of benzene is required to be low e.g. below 1%, and without being concerned about sensitivity to heteroatoms e.g. sulfur, oxygenates, or olefins, being fed to the aromatization. Furthermore, none of the above citations disclose or teach a process or plant by which RGWS is conducted in non-selective mode and in an electrically heated RWGS-unit (e-RWGS).

SUMMARY OF THE INVENTION

Accordingly, in a first aspect of the invention there is provided a process for producing a hydrocarbon product boiling in the gasoline boiling range, said process comprising the steps of:

i) converting a feedstock comprising $CO_2$ and $H_2$ into a synthesis gas in a synthesis gas section, by conducting a reverse water gas shift reaction in a reverse water gas shift (RWGS) unit, such as an electrically heated RWGS unit (e-RWGS unit), for thereby producing said synthesis gas;

ii) passing at least a part of the synthesis gas to a synthetic fuel synthesis unit comprising Fischer-Tropsch (FT) synthesis in a FT-synthesis reactor for producing one or more FT-product streams including a FT-condensate stream, optionally also a FT-tail gas stream, and subsequent hydroprocessing of the one or more FT-product streams in one or more hydroprocessing stages, for producing a hydrocarbon product boiling at above 30° C., including a hydrocarbon product boiling in the diesel fuel range, optionally a hydrocarbon product boiling in the jet fuel range, and a naphtha stream;

iii) upgrading at least a portion of said naphtha stream and/or at least a portion of the FT-condensate stream, such as a light portion of the FT-condensate stream, by passing it through an aromatization stage comprising: contacting the at least a portion of said naphtha stream, and/or the at least a portion of the FT-condensate stream with a catalyst comprising an aluminosilicate zeolite, thereby producing said hydrocarbon product boiling in the gasoline boiling range, and a separate light hydrocarbon gas stream, such as liquid petroleum gas (LPG) stream; and wherein the aluminosilicate zeolite has a MFI-structure, the temperature is in the range 300-500° C., the pressure is 1-30 bar, and optionally there is addition of hydrogen i.e. optionally, the aromatization is conducted in the presence of hydrogen.

Thereby it is now possible to simultaneously produce a full range of transportation fuels: gasoline, diesel and jet fuel. Furthermore, high flexibility is also achieved. For instance, if jet fuel is not desired, it can simply be blended into the diesel. The gasoline produced has a low content of benzene, thereby avoiding the need of providing a subsequent step for removing the benzene or further converting it to other chemicals such as ethylbenzene. By keeping the content of benzene low, e.g. lower than 1% (wt. basis) a higher yield of gasoline is also obtained.

The invention enables therefore, in a simple manner, to produce the gasoline, diesel and jet fuel according to specifications, by i.a. including an aromatization stage which is heteroatom-resistant, e.g. sulfur-resistant, as well as robust with respect to the feed, i.e. the at least a portion of said naphtha stream and/or at least a portion of the FT-condensate stream (in step iii), which may contain a significant amount of oxygenates or olefins.

For the purposes of the present application, the term “aluminosilicate zeolite” is used interchangeably with the term “zeolite”.

In an embodiment according to the first aspect of the invention, in step iii) the catalyst is incorporated, e.g. supported, in the aluminosilicate zeolite, such as a catalyst incorporated in the zeolite having a MFI structure, in particular ZSM-5, preferably Zn-ZSM-5, ZnP-ZSM-5, Ni-ZSM-5, or combinations thereof.

In a particular embodiment, in step iii) i.e. in the aromatization stage, the temperature is in the range 300-460° C. or 300-420° C., and the pressure is 2-30 bar or 10-30 bar.

It would be understood, that the temperature in a given stage or reactor (unit) thereof, means the inlet temperature in an adiabatic step, or the reaction temperature in an isothermal step.

In another particular embodiment, in step iii) the liquid hourly space velocity (LHSV) is in the interval 1-3, for instance 1.5-2.

Thereby a high yield of upgraded naphtha is obtained while at the same time valuable LPG is also produced as so is dry-gas (C1+C2). LPG and dry-gas may be recycled to the synthesis gas section, and/or used as hydrocarbon feed gas in a dedicated hydrogen producing unit (HPU), as described farther below.

As used herein, the term “MFI structure” means a structure as assigned and maintained by the International Zeolite Association Structure Commission in the Atlas of Zeolite Framework Types, which is at http://www.iza-structure.org/databases/or for instance also as defined in “Atlas of Zeolite Framework Types”, by Ch. Baerlocher, L. B. McCusker and D. H. Olson, Sixth Revised Edition 2007.

As used herein, “Zn-ZSM-5” means Zn incorporated in the zeolite ZSM-5, and includes Zn supported on ZSM-5. The same interpretation applies when using ZnP, or Ni.

By the invention, step i), i.e. in the synthesis gas section, comprises:

conducting a reverse water gas shift reaction in a reverse water gas shift (RWGS) unit, such as an electrically heated RWGS unit (e-RWGS unit), for thereby producing said synthesis gas.

In step i) some reforming of e.g. hydrocarbons in the feedstock comprising $CO_2$ and $H_2$ may take place. This is particularly the case, where in step i) the RWGS unit, i.e. according to the reverse water gas shift reaction $CO_2$+

$H_2$=CO+$H_2O$, is conducted in a mode, whereby a catalyst for RWGS, apart from being active for RWGS, is also active for conducting steam reforming, i.e. by the reactions $CH_4$+$H_2O$=CO+3$H_2$; $CH_4$+2 $H_2O$=$CO_2$+4 $H_2$. The reverse of these reactions is also referred as methanation and may also take place. This mode of conducting RWGS is herein denoted as non-selective mode i.e. non-selective RWGS, such as non-selective e-RWGS. Hence, the term "non-selective mode" means that in addition to the reverse water gas shift reaction, steam reforming and/or methanation reactions take place. By operating in this mode, lower internal concentrations of CO in e.g. the e-RWGS unit (reactor) compared to when only conducting the reverse water gas shift reaction, is possible, thereby reducing the potential for undesired carbon formation or metal dusting, particularly at the moderate temperature range of 400-800° C. or 600-800° C., above which there is no potential for CO-reduction and thereby metal dusting. As is well-known in the art, carbon forming reactions via conversion of CO(g) or $CO_2$(g) to C(s), are exothermic and thus are favored at lower temperatures. The non-selective RWGS has the additional advantage that any hydrocarbons present in the feedstock or in a recycle gas stream to the synthesis gas section can be steam reformed in the same RWGS unit. When the RWGS is conducted in selective mode, only the reverse water gas shift reaction takes place.

Suitable catalysts may e.g. comprise copper, nickel, ruthenium, rhodium, iridium, platinum, cobalt, or a combination thereof, as the catalytic active material. Thus, one possible catalytically active material is a combination of nickel and rhodium and another a combination of nickel and iridium. The catalyst is suitably also supported on a metal oxide, such as alumina.

For proper FT-synthesis, $CO_2$ in the feedstock needs to be converted together with the hydrogen to CO by means of the reverse water gas shift reaction, thereby tailoring the thus produced synthesis gas to have the desired $H_2$/CO molar ratio of about 2 suitably for downstream FT-synthesis.

As used herein, the term "feedstock" encompasses one or more main feed streams that may enter into the synthesis gas section. Thus, the feedstock may comprise a stream comprising $CO_2$ and $H_2$. This stream may contain minor amounts of hydrocarbons, for instance 10% vol. or less, e.g. 5% vol. or less of light hydrocarbons such as methane, and for instance also CO, $N_2$, Ar.

In an embodiment, the feedstock comprises only $CO_2$ and $H_2$.

In an embodiment, the feedstock is provided as separate feedstock streams, in which a first feedstock comprises $CO_2$ and a second feedstock comprises $H_2$. The feedstock comprising $CO_2$ is a $CO_2$-stream comprising 75% vol. or more $CO_2$, such as 80% vol., 85% vol., 90% vol., 95% vol. or higher, e.g. over 99% vol. The feedstock comprising $H_2$ is a $H_2$-stream comprising 75% vol. or more $H_2$, such as 80% vol., 85% vol., 90% vol., 95% vol. or higher, e.g. over 99% vol.

Suitably, the first feedstock comprises only $CO_2$, and the second feedstock comprises only $H_2$. A feedstock comprising only $CO_2$ means containing over 99% vol. $CO_2$. A feedstock comprising only $H_2$ means containing over 99% vol. $H_2$.

In an embodiment, the volume ratio of $H_2/CO_2$ in the feedstock is between 2.5 and 4, such as 2.8-3.5. It would be understood, that this ratio relates to the feedstock, i.e. fresh feed, and does not include any recycle stream, such as FT-tail gas or LPG, as described farther below, or any external hydrocarbon source i.e. a hydrocarbon not generated in the process, such as natural gas.

Thereby, the conversion to synthesis gas in step i) is not $CO_2$-reforming, or the conversion to synthesis gas in step i) is tailored to reduce $CO_2$-reforming. As is well known in the art, $CO_2$-reforming, also referred as dry reforming, is a process for producing synthesis gas from the reaction of carbon dioxide with hydrocarbons such as methane, for instance in accordance with the reaction: $CO_2$+$CH_4$→2 $H_2$+2 CO. The $H_2$/CO molar ratio is here 1, which is much lower than the desired $H_2$/CO molar ratio of 2 for FT-synthesis.

As used herein, the term "synthesis gas" (syngas) means a gas mixture containing mainly carbon oxides (CO, $CO_2$) and hydrogen. Other components such as methane, steam, and nitrogen may also be present, typically in minor amounts.

As used herein, the term "hydrocarbon product" means a synthetic fuel produced by FT-synthesis. Synthetic fuel is also referred as synfuel.

As used herein, the term "hydrocarbon product boiling in the gasoline boiling range" is used interchangeably with the term "gasoline" and means boiling in the range 30-210° C. It would be understood that this hydrocarbon product corresponds to upgraded naphtha from FT-synthesis.

As used herein, "naphtha stream" is used interchangeably with the term "naphtha" and means a hydrocarbon product boiling in the range 30-210° C., for instance 30-160° C.

As used herein, "hydrocarbon product boiling in the diesel fuel range" is used interchangeably with the term "diesel" and means a hydrocarbon product boiling in the range 120-360° C., for instance 160-360° C.

As used herein, "hydrocarbon product boiling in the jet fuel range" is used interchangeably with the term "jet fuel" and means a hydrocarbon product boiling in the range 170-300° C., for instance 175-288° C.

As used herein, boiling in a given range, shall be understood as a hydrocarbon mixture of which at least 80 wt % boils in the stated range.

As used herein, "light hydrocarbon gas" means a gas mixture comprising C1-C4 gases, in particular methane, ethane, propane, butane; the light hydrocarbon gas may also comprise i-C3, i-C4 and unsaturated C3-C4 olefins. A particular light hydrocarbon gas is LPG as defined below.

As used herein, "LPG" means liquid/liquified petroleum gas, which is a liquified gas mixture mainly comprising propane and butane, i.e. C3-C4; LPG may also comprise i-C3, i-C4 and unsaturated C3-C4 such as C4-olefins.

As used herein, the term "stage" and "step" are used interchangeably. For instance, "aromatization stage" means "aromatization step". It would also be understood that a "stage" or "step" may include one or more sub-steps. It would also be understood, that a given stage is conducted in a corresponding unit or combination of units; for instance, the aromatization stage is conducted in an aromatization unit such as an aromatization reactor.

It would be understood that at least a portion, e.g. a part, of the FT-condensate stream can be bypassed around the hydroprocessing which includes a hydrocracking unit, and sent to aromatization, preferably sent directly to aromatization. By the term "directly to aromatization" is meant that the part of the FT-condensate stream is not passed through an intermediate step changing the composition of the FT-condensate stream.

In general, throughout the application the term "directly" in the context of passing a stream to a given unit or stage means that the stream is not passed through an intermediate step changing the composition of the stream.

From the FT-synthesis reactor one or more FT-product streams are generated. These streams are hydrocarbon products stream. One of these streams is e.g. a wax product stream; another is the FT-condensate stream. The FT-condensate stream, as is well known in the art, is a raw liquid hydrocarbon product.

In an embodiment according to the first aspect of the invention, the at least a portion of the FT-condensate stream is a light portion of the FT-condensate stream. In a particular embodiment, the light portion of the FT-condensate stream is derived by subjecting the at least a portion of the FT-condensate stream to a separation or fractionation step.

Using the FT-condensate stream as feed to the aromatization without this stream being hydroprocessed, thereby bypassing the hydroprocessing, is counterintuitive. This FT-condensate stream is normally expected to contain oxygenates and olefins. While it is expected that having oxygenates in the gasoline may contribute to improve the octane number, surprisingly the presence of olefins is also advantageous. In particular, light olefins such as C3-C5 olefins, actually facilitate the aromatization reactions in the aromatization stage of step iii). Furthermore, contrary to prior art naphtha aromatization processes such as naphtha reforming, the aromatization according to the present invention is sulfur resistant and the feed can contain a significant amount of oxygenates.

The naphtha stream may also be combined with said FT-condensate stream prior to entering the aromatization stage.

In an embodiment according to the first aspect of the invention, in step ii) subsequently to the one or more hydroprocessing stages, a fractionation step is provided in a fractionation unit for producing said a hydrocarbon product boiling at above 30° C. including a hydrocarbon product boiling in the diesel fuel range, a hydrocarbon product boiling in the jet fuel range, and a naphtha stream. Heavy fractions such as wax and lube oil may also be generated.

It would be understood, that by the term "synthetic fuel synthesis unit" is meant a Fischer-Tropsch (FT) synthesis section comprising a FT reactor, i.e. one or more FT reactors. The FT synthesis section includes a Product Workup Unit (PWU) comprising one or more hydroprocessing stages or units e.g. hydrocracking, for upgrading the FT-product streams, e.g. the FT-condensate from the FT reactor into the hydrocarbon product. The PWU may further include a fractionation stage or unit. The PWU may be located at the same site as the FT-reactor and other associated units or in a separate location. For details on FT synthesis section, reference is given to Steynberg A. and Dry M. "Fischer-Tropsch Technology", Studies in Surface Sciences and Catalysts, vol. 152.

In an embodiment, the process further comprises, prior to step i):

- providing a carbon capture and utilization step (CCU) and deriving, i.e. withdrawing, thereof the $CO_2$ of the feedstock in step i), and/or
- providing a hydrocarbon feed gas such as biogas and deriving, i.e. withdrawing, thereof the $CO_2$ of the feedstock in step i); and/or
- providing a water (steam) electrolysis step, such as by electrolysis in a solid oxide electrolysis cell (SOEC)-unit or an alkaline/PEM electrolysis unit, and deriving, i.e. withdrawing, thereof the $H_2$ of the feedstock of step i).

The $CO_2$ and $H_2$ of the feedstock are thereby generated from a source upstream said step i), i.e. upstream the RWGS unit: $CO_2$ from CCU, and $H_2$ from water (steam) electrolysis.

Accordingly, in a particular embodiment, the $CO_2$ of the feedstock in step i) is a $CO_2$-stream derived, from carbon capture and utilization, CCU, for instance $CO_2$ being recovered as emission product of a power plant using coal or similar, or $CO_2$ captured from the air.

As used herein and as is well-known in the art, the term "carbon capture and utilization, CCU" means a process step by which carbon dioxide, such as industrial carbon dioxide e.g. the $CO_2$ being recovered as emission product of a power plant using coal or similar, or $CO_2$ captured from the air, is re-used, by e.g. by conversion into valuable products.

It would also be understood, that CCU represents an alternative route to the also known "carbon capture and sequestration (CCS)", whereby the captured carbon dioxide, is instead permanently stored underground.

The present invention thus enables using captured $CO_2$ to generate useful commercial transportation fuels, while providing carbon neutrality, and at the same time making CCU a financially viable approach.

In another particular embodiment, the $CO_2$ of the feedstock in step i) is a $CO_2$-stream derived from a hydrocarbon feed gas, such as hydrocarbon feed gas having a high concentration of $CO_2$, for instance 20% vol. or more $CO_2$. In a particular embodiment thereof, said hydrocarbon feed gas is biogas. Biogas is a renewable energy source that can be used for heating, electricity, and many other operations. Biogas can be cleaned and upgraded to natural gas standards, when it becomes bio-methane. Biogas is primarily methane ($CH_4$) and carbon dioxide ($CO_2$), typically containing 60-70% vol. methane. Up to 30% vol. or even 40% vol. of the biogas may be $CO_2$. Typically, this $CO_2$ is removed from the biogas and vented to the atmosphere in order to provide a methane rich gas for further processing or to provide it to a natural gas network. By the present invention, the removed $CO_2$ may be instead utilized as part of the feedstock.

It would be understood, that said hydrocarbon feed gas, represents an external hydrocarbon feed gas, i.e. from an external hydrocarbon source, here biogas.

In another particular embodiment, the $H_2$ of the feedstock of step i) is a $H_2$-stream derived from electrolysis of water (steam), such as by electrolysis in a solid oxide electrolysis cell (SOEC) unit or an alkaline/PEM electrolysis unit. As used herein, the term "water (steam)" includes liquid water and steam. The term "water (steam)" is understood as "water or steam", or interchangeably "liquid water or steam". Liquid water is used in the alkaline/PEM electrolysis, while steam is used in the SOEC electrolysis. From the electrolysis unit, oxygen is also produced, which may be used in the process, for instance when using an autothermal reformer (ATR), as it will become apparent from one of the below embodiments.

The above embodiments, whereby the $CO_2$ and $H_2$ of the feedstock are generated from the upstream sources, convey several additional advantages:

- Reduction of carbon emissions, as $CO_2$ which otherwise will be emitted to the atmosphere in e.g. a separate coal power plant or similar, is purposely used as part of the feedstock in the process/plant.
- $H_2$ from renewable sources can be used, for instance where the power for the water (steam) electrolysis is derived from renewable resources such as wind, hydropower and/or solar energy.

Steam produced in the process, or in an external process, may advantageously be used as feed for the SOEC unit, thereby integrating process lines (here steam) into the process/plant.

The produced hydrocarbon fuels, namely gasoline, diesel and jet fuel, can be categorized and utilized as e-fuels. The term "e-fuel" means electro-fuel and defines a liquid fuel made from water and carbon dioxide in a process powered by electricity generated by renewable sources, such as wind, hydropower and/or solar energy. The e-fuel can be used in an internal combustion engine. In particular, the jet fuel may be regarded as sustainable aviation fuel (SAF). The hydrogen produced from water (steam) electrolysis reacts with $CO_2$ to produce the e-fuel.

The contribution of renewable source in the production of the e-fuels is even more pronounced, where apart from the $H_2$ being produced by water (steam) electrolysis, the subsequent generation of synthesis gas in step i) is conducted by electrically heated reverse water gas shift (e-RWGS) and optional electrically heated steam methane reforming (e-SMR) where electrical resistance is used for generating the heat, as it will become apparent from one or more of the embodiments recited farther below, and optionally also by using e-SMR in a dedicated hydrogen producing unit as it also will become apparent from a below embodiment.

For the purposes of the present application, the term e-SMR and e-reforming (or electrically heated steam methane reformer) are used interchangeably.

For the purposes of the present application, the term alkaline/PEM electrolysis unit means alkaline and/or PEM electrolysis unit (e.g. alkaline cells or polymer cells units). The SOEC and alkaline/PEM electrolysis technologies are well known in the art.

When the electrolysis of $H_2O$ to $H_2$ is based on liquid water, which is the case for alkaline/PEM electrolysis the heat of evaporation of the water is saved. Alternatively, when the electrolysis of $H_2O$ to $H_2$ is based on steam, which is the case of SOEC, steam produced in the process may be used, as described above.

In an embodiment according to the first aspect of the invention, the process comprises adding to step i) a recycle gas stream including one or more of: a portion of the naphtha stream of step ii); an off-gas stream generated from the hydroprocessing stage of step ii); a light hydrocarbon stream such as an LPG stream derived from step iii); tail gas (FT-tail gas) stream generated in the FT-synthesis of step ii), preferably a pretreated FT-tail gas.

It would be understood that a recycle gas stream represents an internal recycle gas stream, since it is generated in the process. Accordingly, it represents an internal source of $CO_2$ and hydrocarbons. Some of the recycle gas streams may be combined prior to entering the synthesis gas section, for instance the light hydrocarbon stream derived from step iii) and the off-gas stream generated from the hydroprocessing stage of step ii) i.e. refinery off-gas. Such off-gas is rich in hydrocarbons such as $C4^-$ compounds as well as carbon oxides (CO, $CO_2$) and $H_2$, and therefore are suitable for use in the synthesis gas section. The light hydrocarbon stream apart from LPG e.g. produced during aromatization may also include a so-called dry gas (C1+C2) which is normally undesired, yet by the present invention can be used as a valuable hydrocarbon feed gas being part of the internal recycle gas streams.

Thereby high integration of the process and plant is achieved. For instance, light hydrocarbon gas, e.g. LPG, instead of being disposed-off, is regarded as a valuable part of the internal recycle gas streams to the synthesis gas section of step i). Optionally, LPG may be exported as a valuable product.

As describe above, in step ii) the FT-synthesis also generates a tail gas (FT tail gas).

As used herein, by "tail gas" or "FT tail gas" is meant off-gas from a Fischer-Tropsch synthesis unit, the tail gas comprising: 5-35% vol. CO e.g. 10-30% vol. CO; 5-35% vol. $H_2$ such as 10-30 vol. % $H_2$; 5-35% vol. $CO_2$ or even more e.g. up to 70% vol. e.g. 20-70% vol. $CO_2$, more than 2% vol. $CH_4$ e.g. 5-25% vol. $CH_4$. The tail gas may also comprise higher hydrocarbons such as ethane and propane and including olefins, for instance 0.5-10% vol.; as well as argon and nitrogen.

In a particular embodiment, part or all of the tail gas is added to step i), i.e. recycled, to the synthesis gas section (synthesis gas preparation section). Due to among other things the presence of olefins in the FT tail gas, this gas is often aggressive and may need to be treated prior to being recycled to the synthesis gas section. Accordingly, in another particular embodiment, the pretreated FT-tail gas stream is a FT-tail gas which has been subjected to a pretreatment step including: hydrogenation and optionally, with steam addition: water gas shift i.e. according to the reaction $CO+H_2O=H_2+CO_2$; and/or prereforming i.e. whereby higher hydrocarbons are steam reformed, i.e. according to the reaction (example for ethane): $C_2H_6+2H_2O \rightarrow 2CO+5H_2$.

The prereforming is conducted in a prereforming unit (prereforming reactor). The prereforming reaction above will be accompanied by the following two reactions which will typically be close to chemical equilibrium at the outlet of the prereforming reactor:

$$CO+H_2O \leftrightarrow H_2+CO_2; CH_4+H_2O \leftrightarrow CO+3H_2$$

The outlet from the prereforming reactor may optionally be cooled and part or all of the water may be removed by condensation. The resultant gas is then used as the recycle gas stream for the synthesis gas section.

The hydrogenation removes or reduces the concentration of the olefins, while the water gas shift reduces the concentration of carbon monoxide at the inlet of the unit used for synthesis gas formation in the synthesis gas section, thereby reducing the potential for carbon formation. The prereforming step reduces the concentration of higher hydrocarbons (hydrocarbons with two or more carbon atoms) thereby also reducing the potential for carbon formation. Further details of pre-reforming are provided farther below in connection with other embodiments of the invention.

In an embodiment according to the first aspect of the invention, the process comprises adding to the synthesis gas section in step i) a hydrocarbon feed gas from an external source, such as natural gas, and wherein step i), i.e. in the synthesis gas section, further comprises:

conducting steam reforming of hydrocarbons in a steam reforming unit, such as an electrically heated steam methane reformer (e-SMR), and/or an autothermal reformer (ATR) i.e. an autothermal reforming unit, for thereby producing said synthesis gas.

In a particular embodiment, the hydrocarbon feed gas from an external source is biogas. Thus, in addition to the reverse water gas shift in step i), the process may also comprise steam reforming, for instance in parallel with the reverse water gas shift of step i). Thereby there is increased flexibility in the process, since in addition to the non-hydrocarbon feed ($CO_2+H_2$), an external hydrocarbon feed gas such as natural gas (co-feed) may be used in the synthesis gas section. Steam may be added to the hydrocarbon feed gas prior to conducting said steam reforming.

In an embodiment according to the first aspect of the invention, the RWGS unit is an electrically heated RWGS (e-RWGS) unit and the optional steam reforming unit when co-feeding e.g. natural gas is an electrically heated steam methane reformer (e-SMR), and/or an autothermal reformer (ATR).

The use of an e-RWGS unit instead of a traditional fired RWGS unit, enables producing a synthesis gas with low content of $CO_2$, which is desired for the FT synthesis, since the high temperature of e-RWGS operation ensures a high conversion of $CO_2$ to CO.

In an embodiment, in step i) the temperature of the synthesis gas from the e-RWGS unit, i.e. the exit gas temperature, is 900° C. or higher, such as higher than 1000° C. or even higher than 1050° C., for instance in the range 900-1100° C. A high temperature, as mentioned before, has the advantage of enabling a higher conversion of $CO_2$ into CO. Furthermore, a low concentration of methane in the synthesis gas can be achieved by operating at such temperatures out of the e-RWGS unit. It is an advantage of the e-RWGS unit that a higher temperature can be achieved than what is typically possible with a traditional externally fired reactor.

The e-RWGS unit may be one or more e-RWGS units, i.e. one or more e-RWGS reactors. In one embodiment, it is a single e-RWGS unit, i.e. a single e-RWGS reactor. In connection with any of these embodiments, the methane concentration at, at least one point inside the RWGS-unit, may be higher than both the methane concentration of the reactor feed gas and the reactor exit gas (synthesis gas). The reactor feed gas may be the feedstock comprising $CO_2$ and $H_2$. The reactor feed gas may also include a recycle stream and/or a hydrocarbon feed gas from an external source, such as natural gas.

As is well-known in the art, the reverse water gas shift and steam methane reforming are highly endothermic reactions, thus requiring significant energy input. Traditionally, such energy (heat) input is provided by using fossil fuels, thus causing increased carbon dioxide emissions and thereby lower effective carbon utilization. By the present invention, the energy input required is provided by electrical heating. The earlier mentioned applicant's co-pending patent applications EP 20201822.2 (equivalent to PCT/EP2021/078304) and PCT/EP2020/084291 (WO 2021110754) disclose, respectively, e-RWGS unit and e-SMR. For a description of e-SMR, reference is also given to applicant's WO 2019/228797 A1.

The e-RWGS and optional e-SMR is a reactor comprising a pressure shell housing a structured catalyst arranged to catalyze RWGS or steam reforming of a feedstock comprising $CO_2$ and $H_2$ or a hydrocarbon feed gas comprising hydrocarbons, said structured catalyst comprising a macroscopic structure of an electrically conductive material, said macroscopic structure supporting a ceramic coating, where said ceramic coating supports a catalytically active material; wherein the reactor moreover comprises an electrical power supply placed outside said pressure shell and electrical conductors connecting said electrical power supply to said structured catalyst, allowing an electrical current to run through said macroscopic structure material to thereby heat at least part of the structured catalyst to a temperature of at least 500° C.

The use of an e-RWGS and optionally e-SMR avoids the need for combustion of a carbon rich gas to provide heat for the endothermic reverse water gas shift reaction or for the steam reforming reaction, as in a conventional RWGS unit or a conventional steam methane reforming (SMR), also often referred as tubular reformer. This reduces the emissions of $CO_2$ from the plant and also reduces other emissions associated with combustion such as NOx and particles. Furthermore, when the electricity needed for the electrical heating comes from renewable sources, the overall emissions of $CO_2$ compared to a conventional RWGS and optional SMR are eliminated or at least substantially reduced.

The electrically heated reactor is also significantly more compact than the conventional RWGS unit or conventional steam reformer. This reduces plot size and the overall cost of the plant and thereby also improve economics.

In particular, when using e-RWGS, optionally together with e-SMR in the synthesis gas section, more particularly also in combination with water(steam) electrolysis for producing the hydrogen, significant electrification is conducted when producing the resulting e-fuels (gasoline, diesel, jet fuel), thus further enabling decreasing the carbon foot print and enabling an even more sustainable production of the e-fuels.

In an embodiment, when the RWGS is conducted, i.e. operated, in a non-selective mode, and the methane concentration by volume in the synthesis gas from the e-RWGS unit is lower than 6% such as lower than 4% or preferably less than 3%. It would be understood that the percentages refer to volume basis (vol. %). High synthesis gas temperature, i.e. exit gas temperature, ensures that the synthesis gas from the e-RWGS has low methane concentration, despite the methane concentration having a peak somewhere along the reaction zone. This enables operation with none, or little, methane in the feed and only little methane in the exit gas (synthesis gas), but with a peak in methane concentration inside the reaction zone higher than in the feed and/or exit gas. It is advantageous in most cases that the concentration of methane in the synthesis gas is as low as possible as methane does not act as a reactant in the downstream FT-synthesis.

Accordingly, in one embodiment, in step i) the methane concentration within the e-RWGS unit is higher than both the concentration of the inlet gas to the e-RWGS unit, e.g. the feedstock comprising $CO_2$ and $H_2$, and higher than the concentration of the exit gas from the e-RWGS unit, i.e. the synthesis gas.

In another embodiment, in step i) the RWGS unit, such as e-RWGS unit, is operated at pressures of 5-20 bar, such as 8-12 bar. These pressures are moderate, thereby also contributing in achieving low methane concentration in the synthesis gas. The synthesis gas leaving the RWGS unit is suitably cooled for removing water by condensation and then compressed to the required pressure for FT-synthesis.

Accordingly, in a particular embodiment, in step i):

the RWGS-unit is an e-RWGS unit being conducted, i.e. operated, in non-selective mode, whereby a catalyst for RWGS, apart from being active for RWGS, is also active for conducting steam reforming and/or methanation;

the temperature of the synthesis gas from the e-RWGS unit is 900° C. or higher, such as higher than 1000° C. or even higher than 1050° C., for instance in the range 900-1100° C.; and optionally the e-RWGS unit is operated pressures of 5-20 bar, such as 8-12 bar.

Thereby, the efficiency of the process and plant for producing the hydrocarbon product, including the hydrocarbon product boiling in the gasoline boiling range, is increased, since step i) can be conducted at a higher conversion of $CO_2$ into CO, while at the same time the higher exit gas temperature and use of moderate pressure ensure a low concentration of methane in the synthesis gas, thus providing a superior synthesis gas to the downstream FT-synthesis, compared to for instance when using traditional (conventional) externally fired RWGS. At the same time, any $CO_2$ produced in the FT-synthesis together with hydrocarbons, and which are carried over as part of e.g. the FT-tail gas (from step ii), are efficiently converted in the e-RWGS, thereby significantly increasing process and plant integration while also reducing its carbon footprint.

An e-RWGS unit is advantageously used in the present invention for carrying out the reverse water-gas shift reaction between $CO_2$ and $H_2$. In a first embodiment the e-RWGS unit suitably comprises:

a structured catalyst comprising a macroscopic structure of electrically conductive material capable of catalysing both reverse water gas shift reaction and methanation reaction, said structured catalyst comprising a macroscopic structure of electrically conductive material, said macroscopic structure supporting a ceramic coating, wherein said ceramic coating supports a catalytically active material (for selective mode e-RGWS);

a pressure shell housing said structured catalyst; said pressure shell comprising an inlet for letting in a feed e.g. said feedstock, and outlet for letting out synthesis gas (syngas product); wherein said inlet is positioned so that said feed enters said structured catalyst in a first end of said structured catalyst and said syngas product exits said structured catalyst from a second end of said structured catalyst;

a heat insulation layer between said structured catalyst and said pressure shell; and at least two conductors electrically connected to said structured catalyst and to an electrical power supply placed outside said pressure shell, wherein said electrical power supply is dimensioned to heat at least part of said structured catalyst to a temperature of at least 500° C. by passing an electrical current through said macroscopic structure of electrically conductive material; wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor substantially to the second end of the structured catalyst and return to a second of said at least two conductors, and wherein the structured catalyst has electrically insulating parts arranged to direct the current from one conductor, which is closer to the first end of the structured catalyst than to the second end, towards the second end of the structured catalyst and back to a second conductor closer to the first end of the structured catalyst than to the second end.

In a second embodiment, the e-RWGS unit suitably comprises:

a structured catalyst comprising a macroscopic structure of electrically conductive material capable of catalysing both reverse water gas shift reaction and methanation reaction, said structured catalyst comprising a macroscopic structure of electrically conductive material, said macroscopic structure supporting a ceramic coating, wherein said ceramic coating supports a catalytically active material (for non-selective mode e-RWGS);

optionally a top layer arranged on top of the structured catalyst, comprising pellet catalyst, capable of catalysing both the methanation reaction and the reverse water gas shift reaction (for non-selective mode e-RWGS);

optionally a bottom layer arranged below the structured catalyst, comprising pellet catalyst, capable of catalysing both the methanation reaction and the reverse water gas shift reaction (for non-selective mode e-RWGS);

a pressure shell housing said structured catalyst; said pressure shell comprising an inlet for letting in said feed and outlet for letting out synthesis gas (syngas product); wherein said inlet is positioned so that said feed enters said structured catalyst in a first end of said structured catalyst and said syngas product exits said structured catalyst from a second end of said structured catalyst;

a heat insulation layer between said structured catalyst and said pressure shell; and at least two conductors electrically connected to said structured catalyst and to an electrical power supply placed outside said pressure shell, wherein said electrical power supply is dimensioned to heat at least part of said structured catalyst to a temperature of at least 500° C. by passing an electrical current through said macroscopic structure of electrically conductive material; wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor substantially to the second end of the structured catalyst and return to a second of said at least two conductors, and wherein the structured catalyst has electrically insulating parts arranged to direct the current from one conductor, which is closer to the first end of the structured catalyst than to the second end, towards the second end of the structured catalyst and back to a second conductor closer to the first end of the structured catalyst than to the second end.

The pressure shell suitably has a design pressure of between 2 and 30 bar. The pressure shell may also have a design pressure of between 30 and 200 bar. The at least two conductors are typically led through the pressure shell in a fitting so that the at least two conductors are electrically insulated from the pressure shell. The pressure shell further comprises one or more inlets close to or in combination with at least one fitting in order to allow a cooling gas to flow over, around, close to, or inside at least one conductor within said pressure shell. The exit temperature of the e-RWGS unit is suitably 900° C. or more, preferably 1000° C. or more, even more preferably 1100° C. or more.

In case of non-selective mode e-RWGS, methanation reactions take place in addition to the RWGS reaction, as recited earlier. The methanation reaction(s) may occur at and near the inlet of the reactor. However, at a given temperature (depends on the feed gas composition, pressure, catalyst activity, extent of heat supply and other factors) the reverse of the methanation reaction will be thermodynamically favoured. In other words, in the first part of the RWGS reactor, methane will be formed and in the second part downstream of the first part methane will be consumed.

In one embodiment of the e-RWGS unit (reactor) of the invention, the e-RWGS reactor comprises a structured catalyst. The said structured catalyst has a first reaction zone disposed closest to the first end of said structured catalyst, wherein the first reaction zone has an overall exothermic reaction, and a second reaction zone disposed closest to the second end of said structured catalyst, wherein the second reaction zone has an overall endothermic reaction. Preferably, said first reaction zone has an extension of between the first 5% to between the first 60% of the length of the total reaction zone in the reactor, wherein reaction zone is understood as the volume of the reactor system catalyzing the methanation and reverse water gas shift reactions as evaluated along the flow path through the catalytic zone.

The combined activity for both reverse water gas shift and methanation in the e-RWGS reactor of the invention entails that the reaction scheme inside the reactor will start out as exothermic in the first part of the reactor system but end as endothermic towards the exit of the reactor system. This relates to the heat of reaction ($Q_r$) added or removed during the reaction, according to the general heat balance of the plug flow reactor system:

$$F\cdot C_{pm}\cdot dT/dV=Q_{add}+Q_r=Q_{add}+\Sigma(-\Delta rH_i)\cdot(-r_i)$$

where F is the flow rate of process gas, $C_{pm}$ is the heat capacity, V the volume of the reaction zone, T the temperature, $Q_{add}$ the energy supply/removal from the surrounding, and $Q_r$ the energy supply/removal associated with chemical reactions which are given as the sum of all chemical reactions facilitated within the volume and calculated as the product between the reaction enthalpy and the rate of reaction of a given reaction.

The term "macroscopic structure" means a structure which is large enough to be visible with the naked eye, without magnifying devices. The dimensions of the macroscopic structure are typically in the range of centimeters or even meters. Dimensions of the macroscopic structure are advantageously made to correspond at least partly to the inner dimensions of the pressure shell, saving room for the heat insulation layer and conductors.

A ceramic coating, with or without catalytically active material, may be added directly to a metal surface by wash coating. The wash coating of a metal surface is a well-known process; a description is given in e.g. Cybulski, A., and Moulijn, J. A., Structured catalysts and reactors, Marcel Dekker, Inc, New York, 1998, Chapter 3, and references herein. The ceramic coating may be added to the surface of the macroscopic structure and subsequently the catalytically active material may be added; alternatively, the ceramic coat comprising the catalytically active material is added to the macroscopic structure.

Preferably, the macroscopic structure has been manufactured by extrusion of a mixture of powdered metallic particles and a binder to an extruded structure and subsequent sintering of the extruded structure, thereby providing a material with a high geometric surface area per volume. A ceramic coating, which may contain the catalytically active material, is provided onto the macroscopic structure before a second sintering in an oxidizing atmosphere, in order to form chemical bonds between the ceramic coating and the macroscopic structure. Alternatively, the catalytically active material may be impregnated onto the ceramic coating after the second sintering. When chemical bonds are formed between the ceramic coating and the macroscopic structure, an especially high heat conductivity between the electrically heated macroscopic structure and the catalytically active material supported by the ceramic coating is possible, offering close and nearly direct contact between the heat source and the catalytically active material of the macroscopic structure. Due to close proximity between the heat source and the catalytically active material, the heat transfer is effective, so that the macroscopic structure can be very efficiently heated. A compact reforming reactor in terms of gas processing per reactor volume is thus possible, and therefore the reactor housing the macroscopic structure may be compact. The reactor of the invention does not need a furnace, and this reduces the size of the electrically heated reactor considerably.

Preferably, the conductors are made of different materials than the macroscopic structure. The conductors may for example be of iron, nickel, aluminum, copper, silver, or an alloy thereof. The ceramic coating is an electrically insulating material and will typically have a thickness in the range of around 100 μm, say 10-500 μm. In addition, a catalyst may be placed within the pressure shell and in channels within the macroscopic structure, around the macroscopic structure or upstream and/or downstream the macroscopic structure to support the catalytic function of the macroscopic structure.

In the e-RWGS reactor, the structured catalyst within said reactor system may have a ratio between the area equivalent diameter of a horizontal cross section through the structured catalyst and the height of the structured catalyst in the range from 0.1 to 2.0. Preferably, the macroscopic structure comprises Fe, Ni, Cu, Co, Cr, Al, Si or an alloy thereof. Such an alloy may comprise further elements, such as Mn, Y, Zr, C, Co, Mo or combinations thereof. Preferably, the catalytically active material is particles having a size from 5 nm to 250 nm. The catalytically active material may e.g. comprise copper, nickel, ruthenium, rhodium, iridium, platinum, cobalt, or a combination thereof. Thus, one possible catalytically active material is a combination of nickel and rhodium and another combination of nickel and iridium. The ceramic coating may for example be an oxide comprising Al, Zr, Mg, Ce and/or Ca. Exemplary coatings are calcium aluminate or a magnesium aluminum spinel. Such a ceramic coating may comprise further elements, such as La, Y, Ti, K, or combinations thereof.

In an embodiment according to the first aspect of the invention, the steam reforming unit in step i) is an autothermal reformer (ATR).

In this case, the exit gas from the e-RWGS reactor is directed to an autothermal reformer. In this embodiment the exit gas from the e-RWGS reactor reacts with an oxidant to produce the final synthesis gas. The synthesis gas is the exit gas from the ATR which in this embodiment typically has a temperature above 950° C., such as above 1020° C., or 1050° C. or above. The exit temperature from the e-RWGS reactor is between 600-900° C. such as between 700-850° C. The e-RWGS reactor may in this embodiment either be selective or preferably be non-selective. In one embodiment a feed gas comprising hydrocarbons is added to the exit gas from the e-RWGS reactor upstream of the autothermal reformer. This could for example be the FT-tail gas.

In such embodiments with an ATR after a non-selective RWGS reactor, the methane concentration leaving the RWGS reactor will preferably be lean, such as less than 20% or preferably less than 12%. A relatively low concentration has the advantage that less oxidant is needed in the autothermal reformer.

The ATR, as is well-known in the art, typically comprises a burner, a combustion chamber, and a catalyst bed contained within a refractory lined pressure shell. In an ATR reactor, partial combustion of the hydrocarbon containing feed by sub-stoichiometric amounts of oxygen is followed by steam reforming of the partially combusted hydrocarbon feed stream in a fixed bed of steam reforming catalyst.

Steam reforming also takes place to some extent in the combustion chamber due to the high temperature, and thus for the purposes of the present application, an ATR is regarded as a steam reforming unit. The steam reforming reaction is accompanied by the water gas shift reaction. Typically, the gas is at or close to equilibrium at the outlet of the reactor with respect to steam reforming and water gas shift reactions.

Combining the e-RWGS unit with the ATR enables that the power needed for the e-RWGS reactor is reduced due to the lower exit temperature. In addition, further integration in the process and plant is possible by adding oxygen generated by the electrolysis of water or steam for producing the hydrogen, to the ATR, thereby at least aiding in the oxidant requirements therein. The oxidant for the ATR may either be oxygen, air, a mixture of air and oxygen, or be an oxidant comprising more than 80% oxygen such as more than 90% oxygen. The oxidant may also comprise other components such as steam, nitrogen, and/or Argon. Typically, the oxidant in this case will comprise 5-20% steam.

In embodiment according to the first aspect of the invention, the steam reforming unit in step i) is a combination of e-SMR and ATR, for instance e-SMR followed by ATR. The use of e-SMR and subsequently ATR in step i) enables a low steam to carbon molar ratio (S/C) in the synthesis gas, e.g. S/C of about 0.6. Thereby less steam is carried in the process with attendant reduction of e.g. equipment size and operation costs, as well as further conveying the benefit of easier tailoring of the $H_2/CO$ molar ratio of the synthesis gas suitable for FT-synthesis, namely $H_2/CO$ molar ratio about 2, more specifically in the range 1.8-2.2, preferably 1.9-2.1.

It would be understood, that this $H_2/CO$ molar ratio in the synthesis gas applies for all instances, e.g. also when e-SMR and optional ATR is not used.

In another embodiment, in step i) the steam reforming further comprises a prior pre-reforming step under the addition of steam in a pre-reforming unit, i.e. in one or more prereformers. Hence, when conducting steam reforming, the synthesis gas section may include pre-reformers, optionally also heater(s) used to preheat the hydrocarbon feed gas prior to the prereforming and/or subsequent steam reforming.

In a prereformer, a hydrocarbon feed gas will, together with steam, and potentially also hydrogen and/or other components such as carbon dioxide, undergo prereforming in a temperature range of ca. 350-550° C. to convert higher hydrocarbons as an initial step in the process. This removes i.a. the risk of carbon formation from higher hydrocarbons on catalyst in the subsequent process steps.

The synthesis gas section may also include a cleaning unit (i.e. gas purification unit) such as a sulfur-chlorine-metal absorption or catalytic unit for purification of the feedstock, in particular the $CO_2$-stream, and/or the additional hydrocarbon feed gas from an external source.

In an embodiment according to the first aspect of the invention, the process further comprises:

iv) passing at least a portion of the hydrogen from the feedstock of step i) to the hydroprocessing of step ii) and/or the aromatization stage of step iii).

Thereby integration and flexibility of the process and plant is achieved, while at the same time avoiding the use of external $H_2$ sources. More specifically, a portion of the hydrogen of the feedstock, in particular hydrogen produced by water (steam) electrolysis, may be used as a hydrogen product for end-users, and also as make-up hydrogen to provide the hydrogen needed for hydroprocessing and/or aromatization during the production of the high-quality gasoline, thereby improving the energy efficiency of the process and plant, as well as providing a more sustainable process where hydrogen from water (steam) electrolysis is used.

Contrary to the prior art, e.g. US 2003/191199 A1, where $CO_2$ produced in the FT-reactor as off-gas, as well as $H_2$ produced by downstream naphtha reforming, are provided as not only internal source but also the main sources of $CO_2$ and $H_2$ in the process, both $CO_2$ and $H_2$ being recycled to the synthesis gas formation reactor—thus, from a downstream unit to upstream unit —, the present invention generates hydrogen from water by electrolysis, which is then fed to e.g. the aromatization stage, while $CO_2$ is provided by e.g. CCU as described above,—thus from an upstream unit to a downstream unit —.

As used herein, the term "process and plant" means the process and plant used to convert the feedstock to the hydrocarbon product boiling in the gasoline boiling range in accordance with above steps i)-iv) and optionally also including step v) recited below and any other of the other below embodiments.

In an embodiment according to the first aspect of the invention, the process further comprises:

v) passing at least a portion of said light hydrocarbon gas stream, preferably directly, to a hydrogen producing unit (HPU) for producing a hydrogen stream.

The HPU thus represents a dedicated unit for producing hydrogen. By using light hydrocarbon gas stream produced in the process, such as LPG, or dry gas (C1+C2), less use of hydrocarbon feed gas from external sources, e.g. natural gas, in the reforming of the dedicated HPU also results. Optimal carbon utilization is thereby achieved.

Thereby also, high integration as well as flexibility in plant operation is achieved. The light hydrocarbon gas, e.g. LPG, instead of being disposed-off, apart from having the option of being used in the synthesis gas section, it may also be used as a valuable hydrocarbon feedstock in a dedicated hydrogen producing unit (HPU) for thereby generating $H_2$ which can be used in the process, for instance in the dedicated HPU itself, or in the FT-synthesis particularly in the hydroprocessing being conducted therein. Optionally also, at least a portion of this hydrogen stream from the HPU is used as part of the feedstock of step i).

Hence, there is a high flexibility in the use of hydrogen produced in the process and plant. For instance, part of the hydrogen produced from water (steam) electrolysis may be used in the hydroprocessing of the FT-synthesis and subsequent aromatization (step iii), as so is the hydrogen stream from the HPU as described above, External use (external sourcing) of hydrogen can be eliminated and instead part of the hydrogen can be exported as valuable end product to customers.

In an embodiment, said hydrocarbon product boiling in the gasoline boiling has at least 20 wt % aromatics in C5+ and an octane number (RON) of at least 80, such as 85, 90, 92 or higher e.g. 95. As used herein, the term "high quality gasoline" means a hydrocarbon product in accordance with these specifications. Suitably, the content of benzene produced in the aromatization stage is kept low, e.g. below 1% (wt. basis).

Preferably, RON is measured according to ASTM D-2699.

The present invention enables producing of high quality gasoline. The naphtha stream from the FT-synthesis step ii), more specifically after the hydroprocessing, is highly paraffinic, thus not suitable to be used as gasoline since the octane number is very low, i.e. RON of about 40.

More specifically, this naphtha stream, withdrawn after the hydroprocessing, contains, preferably as measured by ASTM D-6729: at least 80 wt % or more n+i paraffins, such as 90 wt % or more n+i paraffins, for instance 95 wt % n+i paraffins, for instance at least 60 wt % n-paraffins and at least 30 or 35 wt % i-paraffins; preferably less than 5 wt % aromatics, for instance less than 2 wt % aromatics; preferably less than 5 wt % naphthenes such as less than 3 wt % naphthenes; and preferably less than 1 wt % olefins, for instance less than 0.5 wt % olefins or substantially free of olefins. The subsequent aromatization stage of the naphtha stream, instead of simply using it directly as source of hydrogen in a hydrogen producing unit (HPU) or using it directly as raw material in the production of ethylene and propylene, as explained in connection with the above recital of the prior art, results in a large amount of aromatics thereby increasing the octane number (RON) to at least 80, for instance at least 85, particularly 90 or higher, from as low as 40 or 50-60 in the naphtha stream from FT-synthesis, while at the same time, a significant amount of light hydrocarbon gas, particularly LPG, which is of high commercial value, is also produced e.g. 30-50 wt % LPG. The gasoline yield (C5+ yield) can also be obtained at desired levels e.g. 40-60 wt %. Furthermore, the amount of dry-gas (C1+C2) produced, which is normally regarded as an unwanted byproduct, is advantageously used by the present invention as a valuable by-product which e.g. can be recycled to e.g. the synthesis gas section, for instance as part of the light hydrocarbon gas stream being produced.

The need for hydrogen in the process would typically be satisfied by e.g. electrolysis of steam i.e. by SOEC electrolysis. In addition, as mentioned above, so far paraffinic naphtha has been considered a waste product, yet by its aromatization this low value naphtha is segregated into low hydrogen high-octane aromatic naphtha (high quality gasoline) and LPG with increased hydrogen density i.e. H:C-ratio. The LPG is then recycled to the synthesis gas section as hydrocarbon feed gas or used for hydrogen production in the dedicated HPU, thereby enabling the production of hydrogen that may be of value in the carbon balance of the one or more hydroprocessing stages, or in the aromatization stage, or have a premium value in the market as end product. A high energy efficiency in the process and plant is thereby obtained. Diesel produced in the process and which normally is the desired hydrocarbon product when conducting FT-synthesis, may also be used as part of the hydrocarbon product pool, along with jet fuel. As described above, if jet fuel is not desired, it can simply be blended into the diesel.

By the invention a simple and elegant solution to the creation of valuable products on the basis of a feedstock comprising $CO_2$ and $H_2$ is achieved, by enabling among other things a significant improvement, i.e. more than expected increase of the octane number (RON) of the naphtha from the FT-synthesis. Hence again, it is possible to increase the aromatics content from less than e.g. 2 wt % in the naphtha from the FT-synthesis to 20 wt % or more, such as 20-50 wt %, 25-45 wt %, or 35-45 wt % in C5+ in the high-quality gasoline. The octane number (RON) of the gasoline, having at least 20-45 wt % aromatics, is 80 or higher, such as 85, 90, 92 or 95. The higher the aromatics content of the gasoline, the lower the C5+ yield, yet by the invention it is possible to strike a balance by which the octane number increases significantly without reducing too much the C5+ yield. At the same time, a significant amount of LPG is formed as an additional valuable product due to the dehydrogenation that happens when aromatics are formed, and which, as recited above, is then converted to hydrogen in a steam reforming process in the HPU or used as recycle stream in the synthesis gas section. Optionally, LPG may be exported.

It would be understood, that the term "naphtha from the FT-synthesis" means the naphtha stream from step ii), in particular after the hydroprocessing therein; and/or the at least a portion of the FT-condensate stream, such as a light portion of the FT-condensate stream.

In addition, the invention enables a simpler approach than e.g. catalytic reforming of the naphtha from the FT-synthesis, since the aromatization stage can be conducted at milder conditions, with less expensive catalyst and less expensive process equipment. More specifically, there is no need for noble metals or rare earth metals on the catalyst, there is no chlorine, the catalytic reactor can be operated as a fixed-bed reactor and thus represents a much simpler solution than conventional catalytic reformers.

In an embodiment according to the first aspect of the invention, the one or more hydroprocessing stages in step ii) comprises: hydrodeoxygenation (HDO) e.g. in a first catalytic hydrotreating unit comprising a material catalytically active in HDO i.e. HDO unit; and/or hydrocracking (HCR) e.g. in a second catalytic hydrotreating unit comprising a material catalytically active in HCR i.e. HCR unit; optionally hydrodewaxing/hydroisomerization (HDW/HDI) e.g. in a third catalytic hydrotreating unit comprising a material catalytically active in HDW/HDI i.e. HDW/HDI unit; and optionally also hydrodearomatization (HDA) e.g. in a fourth catalytic hydrotreating unit comprising a material catalytically active in HDA i.e. HAD unit. In particular, when producing jet fuel, HDA is conducted, thereby enabling meeting the aromatic specification of jet fuel.

In a particular embodiment, the one or more hydroprocessing stages in step ii) comprises, combining HDO and HCR, for instance HDO being conducted prior to HCR. In a particular embodiment, HDW is also conducted in addition to or as a part of the HCR, since the catalyst used for HCR may also be active in HDW and thereby also active in isomerization (hydroisomerization, HDI). HCR, HDO, HDW, HDI and HDA are defined farther below.

The separate steps above can be conducted in the same catalytic hydrotreating unit, for instance HCR and subsequent HDW/HDI.

The effect of HCR is the cracking or splitting under the presence of hydrogen of long-chained organic molecules such as C40 paraffins ($C_{40}H_{82}$) into smaller hydrocarbons such as C25 and C15 paraffins ($C_{25}H_{52}$ or $C_{15}H_{32}$) and corresponding isomers. In addition, wax compounds having much larger carbon chains e.g. up to C60, are also cracked into the desired compounds, e.g. diesel and lighter.

The effect of using HCR alone, or after using HDO, in the one or more hydroprocessing stages followed by aromatization of the naphtha from FT-synthesis for production of high quality gasoline is highly unexpected. Producing gasoline conveys namely a yield loss compared to producing diesel which normally would be the actual desired hydrocarbon product, optionally along with jet fuel, when applying FT-synthesis.

The particular combination of HDO and HCR enables a more efficient split of e.g. the wax compounds in the FT-product stream from the FT-reactor into smaller hydrocarbons and thereby production of diesel and lighter compounds. Furthermore, it has been found that the FT-products contain some olefins and some oxygenates. If these compounds are sent directly to a HCR unit, they will increase the amount of coke that is formed on the catalyst and cause deactivation. By hydrotreating (HDO) the FT-products before HCR, the olefins are saturated (converted into paraffins) and the oxygenates are removed (converted into water and paraffins), and thereby the HCR catalyst is protected from excessive deactivation.

The material catalytically active in HDO (as used herein, interchangeable with the term hydrotreating, HDT), typically comprises an active metal (sulfided base metals such as nickel, cobalt, tungsten and/or molybdenum, but possibly also elemental noble metals such as platinum and/or palladium) and a refractory support (such as alumina, silica or titania, or combinations thereof).

HDO/HDT conditions involve a temperature in the interval 250-400° C., a pressure in the interval 30-150 bar, and a liquid hourly space velocity (LHSV) in the interval 0.1-2, optionally together with intermediate cooling by quenching with cold hydrogen, feed or product.

The material catalytically active in HDW/HDI typically comprises an active metal (either elemental noble metals such as platinum and/or palladium or sulfided base metals such as nickel, cobalt, tungsten and/or molybdenum), an acidic support (typically a molecular sieve showing high shape selectivity, and having a topology such as MOR, FER, MRE, MWW, AEL, TON and MTT) and a refractory support (such as alumina, silica or titania, or combinations thereof).

Isomerization conditions involve a temperature in the interval 250-400° C., a pressure in the interval 30-150 bar, and a liquid hourly space velocity (LHSV) in the interval 0.5-8. The material catalytically active in HCR is of similar nature to the material catalytically active in isomerization, and it typically comprises an active metal (either elemental noble metals such as platinum and/or palladium or sulfided base metals such as nickel, cobalt, tungsten and/or molybdenum), an acidic support (typically a molecular sieve showing high cracking activity, and having a topology such as MFI, BEA and FAU) and a refractory support (such as alumina, silica or titania, or combinations thereof). The difference to material catalytically active isomerization is typically the nature of the acidic support, which may be of a different structure (even amorphous silica-alumina) or have a different acidity e.g. due to silica:alumina ratio.

HCR conditions involve a temperature in the interval 250-400° C., a pressure in the interval 30-150 bar, and a liquid hourly space velocity (LHSV) in the interval 0.5-8, optionally together with intermediate cooling by quenching with cold hydrogen, feed or product.

The material catalytically active in hydrodearomatization (HDA) typically comprises an active metal (typically elemental noble metals such as platinum and/or palladium but possibly also sulfided base metals such as nickel, cobalt, tungsten and/or molybdenum) and a refractory support (such as amorphous silica-alumina, alumina, silica or titania, or combinations thereof). HDA conditions involve a temperature in the interval 200-350° C., a pressure in the interval 20-100 bar, and a liquid hourly space velocity (LHSV) in the interval 0.5-8.

In an embodiment according to the first aspect of the invention, step iii) comprises providing after said aromatization stage an isomerization stage, said aromatization stage producing a raw upgraded renewable naphtha stream which is passed through said isomerization stage for thereby forming said hydrocarbon product boiling in the gasoline boiling range. The above recited isomerization conditions may be used in this isomerization. In a particular embodiment, the process further comprises using a portion of a light hydrocarbon gas stream, e.g. a LPG stream, in particular the light hydrocarbon gas stream obtained in step iii), or a portion of the naphtha stream, as heat exchanging medium for quenching said raw upgraded naphtha stream.

Thereby a staged feeding of the feed to the isomerization stage is achieved to improve isomerization and thereby also an increase in aromatization. For instance, by installing an isomerization reactor downstream and aromatization reactor. Isomerization is favored by a lower temperature than the aromatization. Further, make-up hydrogen, for instance hydrogen produced in the HPU may be added in the isomerization, i.e. hydroisomerization (HDI). The product of the aromatization stage gains thereby also an even higher octane number than it otherwise would be possible, i.e. without the isomerization.

In an embodiment according to the first aspect of the invention, the HPU in step v) comprises feeding a hydrocarbon feed gas from an external source such as natural gas, optionally also feeding a part of the naphtha stream of step ii). Hence, the HPU, apart from using the light hydrocarbon gas, particularly LPG, as feedstock, may also use another hydrocarbon feedstock from an external source, such as natural gas (NG), or a hydrocarbon feedstock from another internal source, such as naphtha from FT-synthesis. This results in that the amount of natural gas normally needed to produce $H_2$, is significantly reduced, thereby also significantly reducing the carbon footprint of the HPU and thereby the carbon footprint of the process and plant according to the invention.

In an embodiment according to the first aspect of the invention, the HPU comprises subjecting said light hydrocarbon gas stream and said hydrocarbon feedstock to: cleaning in a cleaning unit, said cleaning unit preferably being a sulfur-chlorine-metal absorption or catalytic unit; optionally pre-reforming in a pre-reforming unit; catalytic steam methane reforming in a steam reforming unit; water gas shift conversion in a water gas shift unit; optionally carbon dioxide removal in a $CO_2$-separator unit; and optionally hydrogen purification in a hydrogen purification unit.

In an embodiment according to the first aspect of the invention, the steam reforming unit is: a convection reformer, preferably comprising one or more bayonet reforming tubes such as an HTCR reformer i.e. Topsoe bayonet reformer, where the heat for reforming is transferred by convection along with radiation; a tubular reformer i.e. conventional steam methane reformer (SMR), where the heat for reforming is transferred chiefly by radiation in a radiant furnace; autothermal reformer (ATR), where partial oxidation of the hydrocarbon feed with oxygen and steam followed by catalytic reforming; electrically heated steam methane reformer (e-SMR), where electrical resistance is used for generating the heat for catalytic reforming; or combinations thereof. In particular, when using e-SMR, electricity from green (renewable) resources may be utilized, such as from electricity produced by wind power, hydropower, and solar sources, thereby further minimizing the carbon footprint.

For more information on these reformers, details are herein provided by direct reference to applicant's patents and/or literature. For instance, for tubular and autothermal reforming an overview is presented in "Tubular reforming and autothermal reforming of natural gas—an overview of available processes", Ib Dybkjaer, Fuel Processing Technology 42 (1995) 85-107; and EP 0535505 for a description of HTCR. For a description of ATR and/or SMR for large scale hydrogen production, see e.g. the article "Large-scale Hydrogen Production", Jens R. Rostrup-Nielsen and Thomas Rostrup-Nielsen", CATTECH 6, 150-159 (2002). For a description of e-SMR which is a more recent technology, reference is given to particularly to applicant's WO 2019/228797 A1 and/or the earlier mentioned PCT/EP2020/084291.

In an embodiment according to the first aspect of the invention, the catalyst in the steam reforming unit is a reforming catalyst, e.g. a nickel-based catalyst. In an embodiment, the catalyst in the water gas shift reaction is any catalyst active for water gas shift reactions. The said two catalysts can be identical or different. Examples of reforming catalysts are $Ni/MgAl_2O_4$, $Ni/Al_2O_3$, $Ni/CaAl_2O_4$, $Ru/MgAl_2O_4$, $Rh/MgAl_2O_4$, $Ir/MgAl_2O_4$, $Mo_2C$, $Wo_2C$, $CeO_2$, $Ni/ZrO_2$, $Ni/MgAl_2O_3$, $Ni/CaAl_2O_3$, $Ru/MgAl_2O_3$, or $Rh/MgAl_2O_3$, a noble metal on an $Al_2O_3$ carrier, but other catalysts suitable for reforming are also conceivable. The catalytically active material may be Ni, Ru, Rh, Ir, or a combination thereof, while the ceramic coating may be $Al_2O_3$, $ZrO_2$, $MgAl_2O_3$, $CaAl_2O_3$, or a combination therefore and potentially mixed with oxides of Y, Ti, La, or Ce. The maximum temperature of the reactor may be between 850-1300° C. The pressure of the feed gas may be 15-180 bar, preferably about 25 bar. Steam reforming catalyst is also denoted steam methane reforming catalyst or methane reforming catalyst.

The above catalyst(s) may also be used when conducting steam reforming in the synthesis gas section of step i).

In a particular embodiment, the $CO_2$ of the feedstock in step i) also includes a $CO_2$-stream derived, i.e. withdrawn, from said carbon dioxide removal in the HPU. Thereby the carbon footprint is further reduced.

In a particular embodiment, the hydrogen purification unit is a Pressure Swing Adsorption unit (PSA unit), said PSA unit producing an off-gas stream which is used as fuel in the steam reforming unit of the HPU e.g. in fired heaters therein, and/or in fired heaters in the optional steam reforming of step i), i.e. step i-2), and/or the aromatization stage of step iii), and/or for steam production. Further integration of the HPU is achieved as well as further reduction of hydrocarbon gas consumption, e.g. natural gas, thereby improving energy consumption figures, i.e. higher energy efficiency, as PSA off-gas which otherwise will need to be burned off (flared), is expediently used in the process.

In an embodiment according to the first aspect of the invention, prior to passing the hydrogen from the feedstock of step i), or prior to passing the hydrogen stream from the HPU in step v), to any of the hydroprocessing stages of step ii) and/or the aromatization stage of step iii), the hydrogen stream passes through a compressor section comprising a make-up compressor, optionally also a recycle compressor, the make-up compressor also producing a hydrogen recycle stream, which is preferably added to the HPU, in particular to the cleaning unit thereof. More specifically, the hydrogen recycle steam may be added to the cleaning unit arranged therein prior to steam reforming. The hydrogen recycle stream may also be added to the synthesis gas section, for instance also to a cleaning unit arranged therein, e.g. a sulfur-chlorine-metal absorption or catalytic unit.

It would be understood that the hydrogen stream is the hydrogen stream from the HPU and is also referred for the purposes of the present invention in certain instances as make-up hydrogen gas.

This enables further integration of the HPU within the plant including with the FT-synthesis fuel unit where hydroprocessing takes place as well as in the subsequent aromatization, since there is no need for a separate or dedicated compressor for recycling hydrogen within the HPU for e.g. hydrogenation of sulfur in the cleaning unit therein.

In another embodiment according to the first aspect of the invention, the reverse water gas shift unit in the synthesis gas section of step i) is e-RWGS, the optional steam reforming unit in the synthesis gas section of step i) is e-SMR, the steam reforming unit in the HPU of step v) is e-SMR, and in addition the hydrogen of the feedstock of step i) is a Hr-stream derived from electrolysis of water(steam) electrolysis. A near fully electrified process and plant is thereby obtained, thereby further improving the sustainability of the e-fuel production.

In a second aspect of the invention, there is also envisaged the overall process plant.

Accordingly, there is also provided a process plant, i.e. a plant, for producing a hydrocarbon product boiling in the gasoline boiling range, comprising:

a) a synthesis gas section arranged to at least receive a feedstock comprising $CO_2$ and $H_2$ and for producing a synthesis gas, said synthesis gas section comprising:
  a-1) a reverse water gas shift (RWGS) unit, such as an e-RWGS unit, arranged for operating in non-selective mode by comprising a catalyst which apart from being active for RWGS, is also active for conducting steam reforming and/or methanation;
  a-2) a water (steam) electrolysis unit, such as a solid oxide electrolysis cell (SOEC) unit or an alkaline/PEM electrolysis unit, for producing said $H_2$;
b) a synthetic fuel synthesis unit arranged for converting said synthesis gas into a hydrocarbon product boiling at above 30° C. including: one or more of a hydrocarbon product boiling in the diesel fuel range, optionally a hydrocarbon product boiling in the jet fuel range, and a naphtha stream; said synthetic fuel synthesis unit comprising:
  b-1) a FT reactor arranged for receiving the synthesis gas and for outletting (exiting) one or more FT product streams including a FT-condensate stream, and
  b-2) a hydroprocessing section arranged downstream said FT reactor for receiving at least a portion of the one or more FT product streams and for producing said hydrocarbon product; the hydroprocessing section optionally also being arranged for receiving a hydrogen stream;
  optionally,
  b-3) a bypass conduit for outletting (exiting) at least a portion of the FT-condensate stream around said hydroprocessing section as a bypass FT-condensate stream;
c) an aromatization section comprising a reactor, suitably a fixed bed reactor, containing a catalyst, the catalyst comprising an aluminosilicate zeolite having a MF1-structure, and arranged to receive said naphtha stream or a portion thereof and said bypass FT-condensate stream, for producing said hydrocarbon product boiling in the gasoline boiling range, and for producing a light hydrocarbon gas stream, such as a liquid petroleum gas (LPG) stream; the aromatization section further being arranged for operating at 300-500° C. and 1-30 bar;

optionally, d) a hydrogen producing unit (HPU) arranged to receive said light hydrocarbon gas stream and optionally arranged to also receive a hydrocarbon feed gas from an external source such as a natural gas stream for producing a hydrogen stream.

The term "synthesis gas section" or "hydroprocessing section" means a physical section comprising a unit or combination of units for conducting a given stage or step.

For instance, the synthesis gas section is the section of the plant where the step of reverse water gas shift and optional steam reforming is conducted; the hydroprocessing section is the section of the plant where the hydroprocessing of the FT-product streams is conducted for producing the hydrocarbon product, and this section may comprise apart from hydroprocessing units such as a hydrodeoxygenation unit (HDO) unit and a hydrocracking (HCR) unit, other units for splitting of the hydrocarbon products such as a fractionation unit e.g. a distillation column.

It would be understood, that the term "hydroprocessing section" corresponds to what is normally referred in the art as Product Workup Unit (PWU) arranged downstream the FT reactor.

In an embodiment according to the second aspect of the invention, the synthesis gas section comprises an e-RWGS unit and/optionally also an e-SMR and/or. In a particular embodiment, the e-RWGS unit and the e-SMR are arranged in parallel. In another particular embodiment, the plant further comprises an autothermal reforming unit (ATR) downstream said e-SMR or downstream said e-RWGS, and/or a prereforming unit upstream said e-SMR and/or ATR.

In an embodiment according to the second aspect of the invention, the hydroprocessing section comprises a HDO unit arranged upstream a HCR unit.

In an embodiment according to the second aspect of the invention, the HPU comprises subjecting said light hydrocarbon gas stream and said hydrocarbon feedstock to: cleaning in a cleaning unit, said cleaning unit preferably being a sulfur-chlorine-metal absorption or catalytic unit; optionally pre-reforming in a pre-reforming unit; catalytic steam methane reforming in a steam reforming unit; water gas shift conversion in a water gas shift unit; optionally carbon dioxide removal in a $CO_2$-separator unit; and optionally hydrogen purification in a hydrogen purification unit.

In another embodiment according to the second aspect of the invention, the plant further comprises a water (steam) electrolysis unit for producing said $H_2$ of the feedstock to the synthesis gas section; the RWGS unit is an e-RWGS unit, the optional steam reforming unit in the synthesis gas section is an e-SMR and the steam reforming unit in the HPU is an eSMR. A near fully electrified process and plant is thereby obtained and thereby a highly sustainable plant, particularly where the electricity is powered by renewable sources such as wind, hydropower and solar energy.

Any of the embodiments and associated benefits of the process according to the first aspect of the invention may be used with any of the embodiments of the process plant according to the second aspect of the invention, and vice-versa.

DETAILED DESCRIPTION

Figure 1:
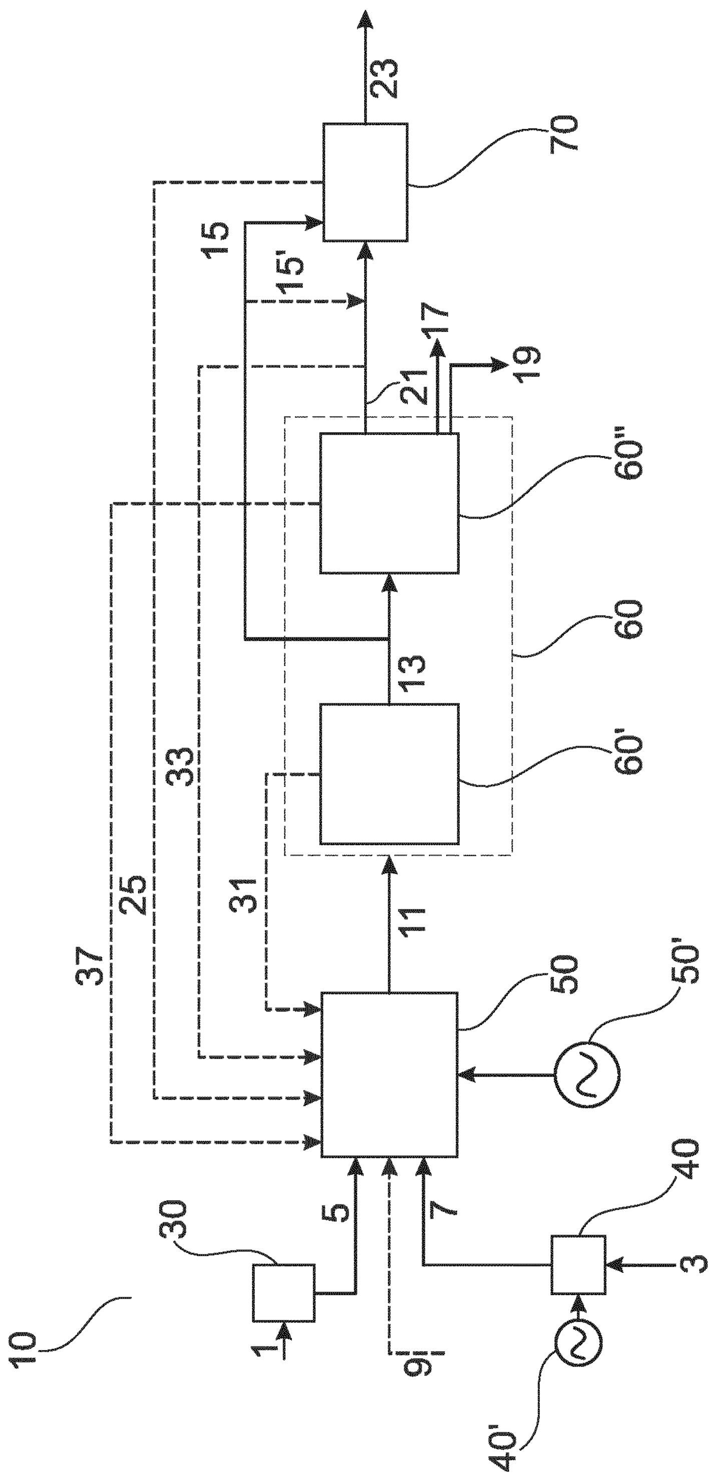
FIG. 1 shows a process/plant layout according to an embodiment of the invention where a feedstock comprising $CO_2$ and $H_2$ is converted to e-fuels.

With reference to the FIG. 1, the process/plant 10 converts a feedstock comprising carbon dioxide stream 5 and hydrogen stream 7 and optionally also a hydrocarbon feed gas from an external source, such as natural gas 9 and internal recycle streams 25, 31, 33, 37 produced in the process as described below, into synthesis gas 11 and then to the hydrocarbon products (synfuels) as the e-fuels: diesel 17, jet fuel 19 and gasoline 23. The $CO_2$ stream 5 is derived from carbon capture, which is schematically represented herein as 30, of a $CO_2$ stream 1 derived or emitted from e.g. another source, such as a power plant. Thus, the $CO_2$ of the feedstock is e.g. derived from carbon-capture and utilization (CCU). Water (steam) 3 passes through an electrolysis unit 40, such as a solid oxide electrolysis cell (SOEC) unit when using steam, or an alkaline/PEM electrolysis unit when using liquid water, powered by electricity 40' generated from a renewable source such as wind, hydropower or solar energy. Thereby the hydrogen stream 7 is generated.

The process/plant comprises a synthesis gas section 50 and a synthetic fuel synthesis unit 60, i.e. FT synthesis section. The synthesis gas section 50 comprises an electrically heated reverse water gas shift unit (e-RWGS), optionally e-reforming (e-SMR), not shown, powered by electricity 50', which also is generated from a renewable source as explained above. The synthetic fuel synthesis unit 60 comprises a FT reactor 60' producing one or more FT-product streams including a FT-condensate stream 13 and which at least a part thereof is treated in downstream hydroprocessing section 60", i.e. Product Workup Unit, PWU.

From the synthetic fuel synthesis unit 60 the hydrocarbon product diesel 17 and jet fuel 19 are produced, along with a FT tail gas (tail gas) 31 withdrawn from the FT reactor 60' which may be recycled to the synthesis gas section 50 after being subjected to a pretreatment (not shown). The hydroprocessing section 60" may comprise a fractionation unit (not shown) downstream the one or more hydroprocessing units arranged therein. From the synthetic fuel synthesis unit 60 a naphtha stream 21 is produced of which a portion 33 may be recycled to the synthesis gas section 50. From the hydroprocessing section 60" an off-gas stream 37 may be withdrawn and also recycled to synthesis gas section 50. The naphtha stream 21 is highly paraffinic and has a low octane number (RON of about 40). The naphtha stream 21 as well as an optional bypass FT-condensate stream 15 is passed to an aromatization stage in unit 70 (catalytic reactor 70), thereby upgrading the naphtha and producing a gasoline product 23 having a high octane number, for instance RON above 90. The bypass FT-condensate stream may also be combined (stream 15') with the naphtha stream 21 prior to entering the aromatization unit 70. From the aromatization unit 70 a light hydrocarbon gas stream 25, such as liquid petroleum gas (LPG) stream, is produced, which may be recycled as stream 25 to synthesis gas unit 50. A portion (not shown) of hydrogen stream 7 is suitably used as hydrogen source for the hydroprocessing 60" and/or downstream aromatization 70.

Figure 2:
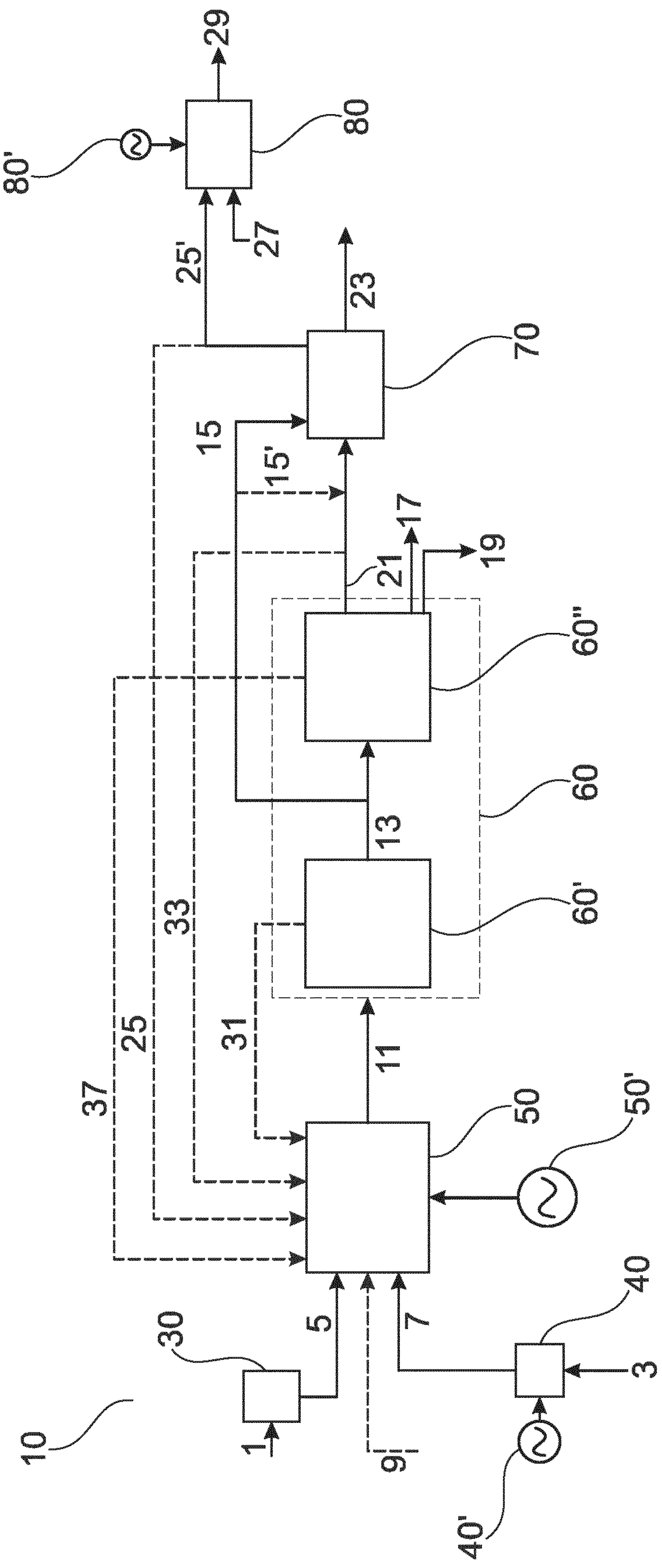
FIG. 2 shows a process/plant layout according to another embodiment of the invention where a feedstock comprising $CO_2$ and $H_2$ is converted to e-fuels and a light hydrocarbon gas stream generated in the process is used for producing hydrogen in a dedicated hydrogen producing unit.

With reference to FIG. 2, the process/plant is as in FIG. 1 but now also include light hydrocarbon stream being passed as stream 25' to a hydrogen producing unit (HPU) 80 for producing hydrogen stream 29 (make-up hydrogen gas). A hydrocarbon feed gas from an external source, such as natural gas 27, or naphtha 21 produced in the process may be used to assist in the hydrogen production (not shown). By using the light hydrocarbon gas stream 25', the need of e.g. natural gas 27 therein is drastically reduced. The produced make-up hydrogen gas 29 may be used for instance as part of the feedstock to the synthesis gas section 50, and/or as make up hydrogen gas in the hydroprocessing section 60", and/or for use within the HPU itself, for instance in a cleaning unit therein (not shown), or as an end product. The HPU 80 includes an e-SMR powered by electricity 80' generated from a renewable source as explained above. Thereby, higher flexibility is achieved, as yet another internal source of hydrogen, apart from hydrogen stream 7, and which can be integrated in the process/plant or used as end-product, is provided. Carbon dioxide from a carbon dioxide removal step (not shown) in the HPU 80, may also be used as part of the feedstock to the syngas section 50, along with stream 5.

The invention claimed is:

1. A process for producing a hydrocarbon product boiling in the gasoline boiling range, said process comprising the steps of:

i) converting a feedstock comprising $CO_2$ and $H_2$ into a synthesis gas in a synthesis gas section, by conducting a reverse water gas shift reaction in a reverse water gas shift (RWGS) unit, for thereby producing said synthesis gas;

ii) passing at least a part of the synthesis gas to a synthetic fuel synthesis unit comprising Fischer-Tropsch (FT) synthesis in a FT-synthesis reactor for producing one or more FT-product streams including a FT-condensate stream, optionally also a FT-tail gas stream, and subsequent hydroprocessing of the one or more FT-product streams in one or more hydroprocessing stages, for producing a hydrocarbon product boiling at above 30° C., including a hydrocarbon product boiling in the diesel fuel range, optionally a hydrocarbon product boiling in the jet fuel range, and a naphtha stream;

iii) upgrading at least a portion of said naphtha stream and, optionally, at least a portion of the FT-condensate stream, by passing it through an aromatization stage comprising: contacting the at least a portion of said naphtha stream, and, optionally, the at least a portion of the FT-condensate stream with a catalyst comprising an aluminosilicate zeolite, thereby producing said hydrocarbon product boiling in the gasoline boiling range, and a separate light hydrocarbon gas stream; and wherein the aluminosilicate zeolite has a MFI-structure, the temperature is in the range 300-500° C., the pressure is 1-30 bar, and optionally there is addition of hydrogen, wherein in step (iii) the catalyst is incorporated in the aluminosilicate zeolite and the aluminosilicate zeolite has the MFI-structure of Ni-ZSM-5, wherein in step i) the RWGS unit is conducted in non-selective mode, whereby a catalyst for RWGS, apart from being active for RWGS, is also active for conducting steam reforming and/or methanation.

2. Process according to claim 1, wherein in step i) the feedstock is provided as separate feedstock streams, in which a first feedstock comprises $CO_2$ and a second feedstock comprises $H_2$, wherein the feedstock comprising $CO_2$ is a $CO_2$-stream comprising 75% vol. or more $CO_2$, and wherein the feedstock comprising $H_2$ is a $H_2$-stream comprising 75% vol. or more $H_2$.

3. Process according to claim 1, wherein the volume ratio of $H_2/CO_2$ in the feedstock is between 2.5 and 4.

4. Process according to claim 1, further comprising prior to step i):

providing a carbon capture and utilization step (CCU) and deriving thereof the $CO_2$ of the feedstock in step i), and/or providing a hydrocarbon feed gas and deriving thereof the $CO_2$ of the feedstock in step i); and/or providing a water (steam) electrolysis step, and deriving thereof the $H_2$ of the feedstock of step i).

5. Process according to claim 1, comprising adding to step i) a recycle gas stream including one or more of: a portion of the naphtha stream of step ii); an off-gas stream generated from the hydroprocessing stage of step ii); a light hydrocarbon stream; tail gas (FT-tail gas) stream generated in the FT-synthesis of step ii).

6. Process according to claim 1, comprising adding to the synthesis gas section in step i) a hydrocarbon feed gas from an external source, and wherein step i) further comprises:

conducting steam reforming of hydrocarbons in a steam reforming unit, for thereby producing said synthesis gas.

7. Process according to claim 1, wherein in step i) further to the RWGS unit being conducted in said non-selective mode:

the RWGS-unit is an e-RWGS unit;

the temperature of the synthesis gas from the e-RWGS unit is 900° C. or higher; and optionally the e-RWGS unit is operated pressures of 5-20 bar.

8. Process according to claim 1, further comprising:

iv) passing at least a portion of the hydrogen from the feedstock of step i) to the hydroprocessing of step ii) and/or the aromatization stage of step iii).

9. Process according to claim 1, further comprising:

v) passing at least a portion of said light hydrocarbon gas stream to a hydrogen producing unit (HPU) for producing a hydrogen stream.

10. Process according to claim 1, wherein the one or more hydroprocessing stages in step ii) comprises: hydrodeoxygenation (HDO) and/or hydrocracking (HCR); optionally hydrodewaxing (HDW); optionally also hydrodearomatization (HDA).

11. Process according to claim 9, wherein the HPU in step v) comprises feeding a hydrocarbon feed gas from an external source, optionally also feeding a part of the naphtha stream of step ii).

12. Process according to claim 9, wherein the HPU comprises subjecting said light hydrocarbon gas stream and a hydrocarbon feedstock to: cleaning in a cleaning unit; optionally pre-reforming in a pre-reforming unit; catalytic steam methane reforming in a steam reforming unit; water gas shift conversion in a water gas shift unit; optionally carbon dioxide removal in a $CO_2$-separator unit; and optionally hydrogen purification in a hydrogen purification unit, and wherein the steam reforming unit of the HPU is: a convection reformer, a tubular reformer, autothermal reformer (ATR), electrically heated steam methane reformer (e-SMR), or combinations thereof.

13. A plant for producing a hydrocarbon product boiling in the gasoline boiling range, comprising:

a) a synthesis gas section arranged to at least receive a feedstock comprising $CO_2$ and $H_2$ and for producing a synthesis gas, said synthesis gas section comprising:

a-1) a reverse water gas shift (RWGS) unit, arranged for operating in non-selective mode by comprising a catalyst which apart from being active for RWGS, is also active for conducting steam reforming and/or methanation;

a-2) a water (steam) electrolysis unit for producing said $H_2$;

b) a synthetic fuel synthesis unit arranged for converting said synthesis gas into a hydrocarbon product boiling at above 30° C. including: one or more of a hydrocarbon product boiling in the diesel fuel range, optionally a hydrocarbon product boiling in the jet fuel range, and a naphtha stream; said synthetic fuel synthesis unit comprising:

b-1) a FT reactor arranged for receiving the synthesis gas and for outletting one or more FT product streams including a FT-condensate stream, and b-2) a hydroprocessing section arranged downstream said FT reactor for receiving at least a portion of the one or more FT product streams and for producing said hydrocarbon product; the hydroprocessing section optionally also being arranged for receiving a hydrogen stream;

optionally, b-3)—a bypass conduit for outletting at least a portion of the FT-condensate stream around said hydroprocessing section as a bypass FT-condensate stream;

c) an aromatization section comprising a reactor, suitably a fixed bed reactor, containing a catalyst, the catalyst comprising an aluminosilicate zeolite having a MFI-structure of Ni-ZSM-5, and arranged to receive said naphtha stream or a portion thereof and said bypass FT-condensate stream, for producing said hydrocarbon product boiling in the gasoline boiling range, and for producing a light hydrocarbon gas stream; the aromatization section further being arranged for operating at 300-500° C. and 1-30 bar;

optionally, d) a hydrogen producing unit (HPU) arranged to receive said light hydrocarbon gas stream and optionally arranged to also receive a hydrocarbon feed gas from an external source.

* * * * *